United States Patent
Lee et al.

(10) Patent No.: US 11,162,695 B2
(45) Date of Patent: Nov. 2, 2021

(54) AIR CONDITIONING SYSTEM

(71) Applicant: KOREA INSTITUTE OF SCIENCE AND TECHNOLOGY, Seoul (KR)

(72) Inventors: Dae Young Lee, Seoul (KR); Jae Hyun Baek, Seoul (KR); Sung Chul Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 315 days.

(21) Appl. No.: 16/119,452

(22) Filed: Aug. 31, 2018

(65) Prior Publication Data

US 2019/0063762 A1    Feb. 28, 2019

(30) Foreign Application Priority Data

Aug. 31, 2017 (KR) .......................... 10-2017-0111037

(51) Int. Cl.
*F24F 3/14* (2006.01)
*F24F 11/81* (2018.01)
(Continued)

(52) U.S. Cl.
CPC .......... *F24F 3/1423* (2013.01); *F24F 3/1429* (2013.01); *F24F 11/81* (2018.01); *F24F 11/86* (2018.01); *F24F 2110/10* (2018.01); *F24F 2110/12* (2018.01); *F24F 2110/20* (2018.01); *F24F 2110/22* (2018.01); *F24F 2110/66* (2018.01); *F24F 2110/70* (2018.01)

(58) Field of Classification Search
CPC ........ F24F 3/1429; F24F 3/1423; F24F 11/81; F24F 11/86; F24F 2110/66; F24F 2110/20; F24F 2110/12; F24F 2110/10; F24F 2110/22

See application file for complete search history.

(56) References Cited

U.S. PATENT DOCUMENTS 6,918,263 B2    7/2005    Lee et al.
7,569,101 B2    8/2009    Hung
(Continued)

FOREIGN PATENT DOCUMENTS

JP    09-229444 A    9/1997
JP    2007010266 A  *  1/2007
(Continued)

*Primary Examiner* — Frantz F Jules
*Assistant Examiner* — Martha Tadesse
(74) *Attorney, Agent, or Firm* — Rabin & Berdo, P.C.

(57) ABSTRACT

Provided is an air conditioning system including: a case including a first sub-case including an outdoor air inlet and a discharge outlet, and a second sub-case including an air returning inlet and an air supply inlet; a desiccant rotor module; a heat exchanger including a first sub-heat exchanger and a second sub-heat exchanger, a ventilator including a first sub-ventilator and a second sub-ventilator; and a damper including a first sub-damper and a second sub-damper, wherein the first sub-damper is installed downstream of the first region of the desiccant rotor module, and the second sub-damper is installed downstream of the second region of the desiccant rotor module, wherein the desiccant rotor module and the heat exchanger are integrally assembled so as to be detachably installed in the case, wherein the outdoor air and the indoor air do not mix with each other.

27 Claims, 11 Drawing Sheets

(51) Int. Cl.
*F24F 11/86* (2018.01)
*F24F 110/66* (2018.01)
*F24F 110/12* (2018.01)
*F24F 110/20* (2018.01)
*F24F 110/22* (2018.01)
*F24F 110/70* (2018.01)
*F24F 110/10* (2018.01)

(56) References Cited

U.S. PATENT DOCUMENTS

| | | |
|---|---|---|
| 8,943,848 B2 | 2/2015 | Phannavong et al. |
| 2004/0194490 A1* | 10/2004 | Lee ................ F24F 3/1423 |
| | | 62/271 |
| 2007/0295215 A1* | 12/2007 | Hung ................ B01D 53/06 |
| | | 96/151 |
| 2013/0260668 A1* | 10/2013 | Stakutis ............... F24F 11/30 |
| | | 454/256 |
| 2017/0016646 A1 | 1/2017 | Lee |

FOREIGN PATENT DOCUMENTS

| | | |
|---|---|---|
| JP | 2008-000741 A | 1/2008 |
| KR | 10-1061944 B1 | 9/2011 |
| KR | 10-1411950 B1 | 6/2014 |
| KR | 101540034 B1 * | 7/2015 |
| KR | 10-1746154 B1 | 6/2017 |
| KR | 10-1769620 B1 | 8/2017 |

* cited by examiner

----- DESICCANT MODE
——— HEAT RECOVERY-VENTILATION MODE, OUTDOOR AIR COOLING MODE

AIR CONDITIONING SYSTEM

CROSS-REFERENCE TO RELATED APPLICATION

This application claims the benefit of Korean Patent Application No. 10-2017-0111037, filed on Aug. 31, 2017, in the Korean Intellectual Property Office, the disclosure of which is incorporated herein in its entirety by reference.

BACKGROUND

1. Field

One or more embodiments relate to an air conditioning system, and more particularly, to an air conditioning system having a mechanically simple structure to select and execute an operational mode such as a desiccant mode, a heat recovery ventilation mode, or an outdoor air cooling mode by controlling whether to operate a heat exchanger, a rotational speed of a desiccant rotor module, or a rotational angle of a damper.

2. Description of the Related Art

An air conditioning system performs a desiccant and cooling operation or a humidification and heating operation to control temperature and humidity of a predetermined space, or performs a ventilation operation to exchange indoor and outdoor air.

Although air conditioning systems are used in various places ranging from a large space such as a large building or a public space to smaller spaces where individuals live and work, efforts have continued toward developing techniques to replace air conditioning systems that use electricity as a main power source in case electricity runs short in summer or in order to overcome this shortcoming.

For example, in houses or commercial buildings, an energy recovery-type ventilator for recovering energy from the air passing through indoors and outdoors is provided for ventilation. Generally, a total heat exchanger capable of recovering or transferring heat from or to the air is used as an energy recovery-type ventilator.

Like in U.S. Pat. Nos. 6,918,263 or 8,943,848, disclosed is a technique of adding heating and cooling by inserting a heat pump into a ventilator, thereby extending functions of the ventilator beyond general ventilation operations. U.S. Pat. No. 6,918,263, for example, discloses that a desiccant function is added by inserting a desiccant rotor into a ventilator. However, this addition of a component increases complexity of the entire system and manufacturing costs.

A total heat exchanger is a component used to recover heat from the air, and a desiccant rotor is used to recover moisture from the air. Since both the total heat exchanger and the desiccant rotor use a method in which heat and humidity are exchanged between portions of air (air-air heat exchanger), they have a significantly greater volume than a liquid-liquid heat exchanger that exchanges heat between liquids or a liquid-air heat exchanger that exchanges heat between a liquid and air. Therefore, it is difficult to include two different components, that is, a total heat exchanger and a desiccant rotor, in a single air conditioning system.

KR 1061944 discloses a ventilation system using a desiccant rotor and a heat pump, in which a total heat exchanger is not installed. However, according to this technique, it is not possible to perform a function of recovering ventilation energy during a ventilation operation.

In addition, there is a growing demand for maintaining comfortable indoor air in industrial sites, public institutions, and homes. In summer, dehumidifiers are installed, and in winter time, humidifiers, separate from dehumidifiers, are installed. However, consumers carry the burden of purchasing, installing, and managing additional devices for desiccant and humidification, and installation of a water container in the humidifier is inconvenient.

The above-described background art is technical information known to the inventor when deducing the embodiments of the present invention or acquired in the process of deducing the same, and is not deemed as being well-known technology disclosed to the general public prior to the filing of the embodiments of the present invention.

PRIOR ART DOCUMENT

Patent Document

KR 1061944 (published on Aug. 29, 2011)
U.S. Pat. No. 8,943,848 (published on Feb. 3, 2015)
U.S. Pat. No. 6,918,263 (published on Jul. 19, 2005)

SUMMARY

One more embodiments include an air conditioning system that is manufactured in a mechanically simple structure.

One more embodiments include an air conditioning system, in which an operational mode such as a desiccant mode, a heat recovery ventilation mode, or an outdoor air cooling mode may be selected and executed.

One or more embodiments include an air conditioning system providing a rigid sealing structure that prevents mixture between or leakage of an outdoor air and an indoor air flowing in a case.

One or more embodiments include an air conditioning system whereby the manufacturing time and costs are reduced to thereby maximize productivity thereof.

Additional aspects will be set forth in part in the description which follows and, in part, will be apparent from the description, or may be learned by practice of the presented embodiments.

According to one or more embodiments, an air conditioning system includes: a case including a first sub-case including an outdoor air inlet and a discharge outlet, and a second sub-case including an air returning inlet and an air supply inlet; a desiccant rotor module that includes a moisture absorbing material and is installed in the case, wherein the desiccant rotor module is rotatable about a rotational shaft extending in a direction across a coupling surface between the first sub-case and the second sub-case; a heat exchanger including a first sub-heat exchanger and a second sub-heat exchanger, wherein the first sub-heat exchanger is installed in a path through which outdoor air entering the case through the outdoor air inlet moves to a first region of the desiccant rotor module and through which a heat transfer medium for heat exchange flows, and the second sub-heat exchanger is installed in a path through which indoor air entering the case through the air returning inlet moves to a second region of the desiccant rotor module, the second region being opposite the first region with respect to the rotational shaft, and through which a heat transfer medium for heat exchange flows; a ventilator including a first sub-ventilator installed upstream or downstream of the first region of the desiccant rotor module and a second sub-ventilator installed upstream or downstream of the second region of the desiccant rotor module; and a damper including a first sub-damper and a second sub-damper, wherein the first sub-damper is installed downstream of the first region of the desiccant rotor module to guide the outdoor air that has passed through the first region of the desiccant rotor module to one of the discharge outlet and the air supply inlet, and the second sub-damper is installed downstream of the second region of the desiccant rotor module to guide the indoor air that has passed through the second region of the desiccant rotor module to the other of the discharge outlet and the air supply inlet, wherein the desiccant rotor module and the heat exchanger are integrally assembled to be detachably installed in the case, wherein the outdoor air and the indoor air do not mix with each other.

A shape of the first sub-case and a shape of the second sub-case may be identical.

The first sub-case may include a portion of the outdoor air inlet, the discharge outlet, the air returning inlet, and the air supply inlet, and the second sub-case may include another portion of the outdoor air inlet, the discharge outlet, the air returning inlet, and the air supply inlet.

The first sub-case may further include at least one first opening, and the second sub-case may further include at least one second opening.

The air conditioning system may further include a fixing plate including: a first sub-fixing plate that is installed between the first sub-case and the desiccant rotor module and includes a first installation support on which the first sub-heat exchanger is installed and a first ventilation inlet providing a path through which the indoor air that has entered through the air returning inlet passes through the second region of the desiccant rotor module and moves to the discharge outlet; and a second sub-fixing plate that is installed between the second sub-case and the desiccant rotor module and includes a second installation support on which the second sub-heat exchanger is installed and a second ventilation inlet providing a path through which the outdoor air that has entered through the outdoor air inlet passes through the first region of the desiccant rotor module and moves to the discharge outlet.

The first sub-case may include a first separation plate that is installed between the first sub-heat exchanger and the second region of the desiccant rotor module and separates the first sub-heat exchanger from the second region of the desiccant rotor module so as to prevent mixture between the outdoor air passing through the first sub-heat exchanger and the indoor air passing through the second region of the desiccant rotor module.

The first sub-fixing plate may further include a first protrusion protruding toward the first separation plate, and the first separation plate may include a first receiving recess receiving the first protrusion.

The second sub-case may include a second separation plate that is installed between the second sub-heat exchanger and the first region of the desiccant rotor module and separates the second sub-heat exchanger from the first region of the desiccant rotor module so as to prevent mixture between the indoor air passing through the second sub-heat exchanger and the outdoor air passing through the first region of the desiccant rotor module.

The second sub-fixing plate may further include a second protrusion protruding toward the second separation plate, and the second separation plate may include a second receiving recess receiving the second protrusion.

The first sub-case may further include a first air flow path region in which the indoor air that has passed through the second region of the desiccant rotor module flows, the second sub-case may further include a second air flow path region in which the outdoor air that has passed through the first region of the desiccant rotor module flows, the air conditioning system may further include an air flow path partitioning plate that separates the first air flow path region from the second air flow path region, and the indoor air flowing in the first air flow path region and the outdoor air flowing in the second flow path region may not mix with each other.

The air conditioning system may further include: a first air supply gate guiding, toward the air supply inlet, the indoor air that has passed through the second region of the desiccant rotor module; and a first air discharge gate guiding, toward the discharge outlet, the indoor air that has passed through the second region of the desiccant rotor module, wherein the first air supply gate and the first air discharge gate may be installed on a portion of the air flow path partitioning plate at the first air flow path region.

The second sub-damper may include: a second damper driver installed on a portion of the air flow path partitioning plate at the second air flow path region; a second damper rotational shaft rotatably connected to the second damper driver to pass through the air flow path partitioning plate and protrude toward the first air flow path region; and a second cover plate connected to the second damper rotational shaft to be movable between a first position in which the first air supply gate is closed and a second position in which the first air discharge gate is closed.

The air conditioning system may further include: a second air discharge gate guiding, toward the discharge outlet, the outdoor air that has passed through the first region of the desiccant rotor module; and a second air supply gate guiding, toward the air supply inlet, the outdoor air that has passed through the first region of the desiccant rotor module, wherein the second air discharge gate and the second air supply gate may be installed on a portion of the air flow path partitioning plate at the second air flow path region.

The first sub-damper may include: a first damper driver installed on the portion of the air flow path partitioning plate at the first air flow path region; a first damper rotational shaft rotatably connected to the first damper driver to pass through the air flow path partitioning plate and protrude toward the second air flow path region; and a first cover plate connected to the first damper rotational shaft to be movable between a third position in which the second air discharge gate is closed and a fourth position in which the second air supply gate is closed.

The heat exchanger may further include a compressor compressing the heat transfer medium and an expansion member expanding the heat transfer medium that has passed through the first sub-heat exchanger, wherein the first sub-heat exchanger may be a condenser heating the outdoor air entering through the outdoor air inlet, and the second sub-heat exchanger may be an evaporator cooling the indoor air entering through the air returning inlet, wherein the compressor, the first sub-heat exchanger, the expansion member, and the second sub-heat exchanger may be sequentially connected to one another via a heat transfer medium pipe.

The desiccant rotor module, the first sub-heat exchanger, the expansion member, and the second sub-heat exchanger may be integrally assembled to be detachably installed in the case.

Moisture contained in the first region of the desiccant rotor module may be evaporated by the outdoor air heated by passing through the first sub-heat exchanger, wherein the second region of the desiccant rotor module may adsorb vapor in the indoor air that is cooled by passing through the second sub-heat exchanger.

The outdoor air that is humidified by passing the first region of the desiccant rotor module may be discharged to the outside through the discharge outlet, and the indoor air that is dehumidified by passing the second region of the desiccant rotor module may be supplied indoors through the air supply inlet.

The air conditioning system may further include a condensate discharge pipe connecting the second sub-heat exchanger with an outlet of the first sub-ventilator, wherein a portion of vapor contained in the indoor air that has entered through the air returning inlet may be condensed on a surface of the second sub-heat exchanger to be guided to the outlet through the condensate discharge pipe.

The air conditioning system may further include a controller including: a driving controller configured to apply a control signal to the desiccant rotor module to control a rotational speed of the desiccant rotor module according to a plurality of operational modes; a heat pump controller configured to apply a control signal to the heat exchanger to control whether to operate the first sub-heat exchanger and the second sub-heat exchanger; and a damper controller configured to apply a control signal to the damper to control a rotational angle of the first sub-damper and the second sub-damper.

The controller may select and execute one of: a desiccant mode in which a rotational speed of the desiccant rotor module is controlled at a low speed of a preset range, the first sub-heat exchanger and the second sub-heat exchanger are actuated, and the first sub-damper is controlled to guide, to the discharge outlet, the outdoor air which has been heated and humidified by passing through the first sub-heat exchanger and the first region of the desiccant rotor module, and the second sub-damper is controlled to guide, to the air supply inlet, the indoor air which has been cooled and dehumidified by passing through the second sub-heat exchanger and the second region of the desiccant rotor module; a heat recovery ventilation mode in which a rotational speed of the desiccant rotor module is controlled at a high speed of a preset range, operations of the first sub-heat exchanger and the second sub-heat exchanger are stopped, the first sub-damper is controlled to guide, to the air supply inlet, the outdoor air which has undergone total heat exchange with the indoor air passing through the second region of the desiccant rotor module while the outdoor air passes through the first region of the desiccant rotor module, and the second sub-damper is controlled to guide, to the discharge outlet, the indoor air which has undergone total heat exchange with the outdoor air passing through the first region of the desiccant rotor module while the indoor air passes the second region of the desiccant rotor module; and an outdoor air cooling mode in which operation of the desiccant rotor module is stopped, operations of the first sub-heat exchanger and the second sub-heat exchanger are stopped, the first sub-damper is controlled to guide the outdoor air to the air supply inlet through the first sub-ventilator, and the second sub-damper is controlled to guide the indoor air to the discharge outlet.

The air conditioning system may further include: an outdoor temperature sensor installed at the outdoor air inlet and configured to sense a temperature of the outdoor air entering through the outdoor air inlet; an indoor temperature sensor installed at the air returning inlet and configured to sense a temperature of the indoor air entering through the air returning inlet; an indoor humidity sensor installed at the air returning inlet and configured to sense a relative humidity of the indoor air entering through the air returning inlet; an indoor carbon dioxide sensor installed at the air returning inlet and configured to sense a carbon dioxide ($CO_2$) concentration of the indoor air entering through the air returning inlet; and an indoor volatile organic compound sensor installed at the air returning inlet and configured to sense a total volatile organic compound (TVOC) concentrations of the indoor air entering through the air returning inlet, wherein the controller may include a sensor receiver configured to receive a temperature of the outdoor air, a temperature of the indoor air, a relative humidity of the indoor air, a carbon dioxide concentration of the indoor air, and a total volatile organic compound concentration of the indoor air respectively sensed using the outdoor temperature sensor, the indoor temperature sensor, the indoor humidity sensor, the indoor carbon dioxide sensor, and the indoor total volatile organic compound sensor.

The air conditioning system may further include a user input unit configured to receive, from a user, a user input signal used to select one of the desiccant mode, the heat recovery ventilation mode, and the outdoor air cooling mode and to receive, from the user, a set value of an indoor relative humidity, a set value of an indoor carbon dioxide concentration, a set value of an indoor volatile organic compound concentration, and a set value of a comfortable indoor cooling temperature from a user to generate a control signal, wherein the controller may further include a user input receiver configured to store the user input signal and the set value of the indoor relative humidity, the set value of the indoor carbon dioxide concentration, the set value of the indoor total volatile organic compound concentration, and the set value of the comfortable indoor cooling temperature.

If a relative humidity of the indoor air received via the sensor receiver is 110% or more of the set value of the indoor relative humidity stored in the user input receiver, the controller may execute the desiccant mode.

A rotational speed of the desiccant rotor module may be proportional to a difference in the relative humidity of the indoor air and the set value of the indoor relative humidity.

If a carbon dioxide concentration of the indoor air received via the sensor receiver is higher than the set value of the indoor carbon dioxide concentration stored in the user input receiver, or if a total volatile organic compound concentration of the indoor air received by the sensor receiver is higher than the set value of the indoor total volatile organic compound concentration stored in the user input receiver, the controller may execute the heat recovery ventilation mode.

A rotational speed of the desiccant rotor module may be proportional to a difference in the carbon dioxide concentration of the indoor air and the set value of the indoor carbon dioxide concentration, and a difference in the total volatile organic compound concentration of the indoor air and the set value of the indoor total volatile organic compound concentration.

The controller may execute the outdoor air cooling mode if the temperature of the outdoor air received via the sensor receiver is lower than the temperature of the indoor air, and at the same time, the temperature of the indoor air received via the sensor receiver is higher than the set value of the comfortable indoor cooling temperature stored in the user input receiver.

In addition to the aforesaid details, other aspects, features, and advantages will be clarified from the following drawings, claims, and detailed description.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
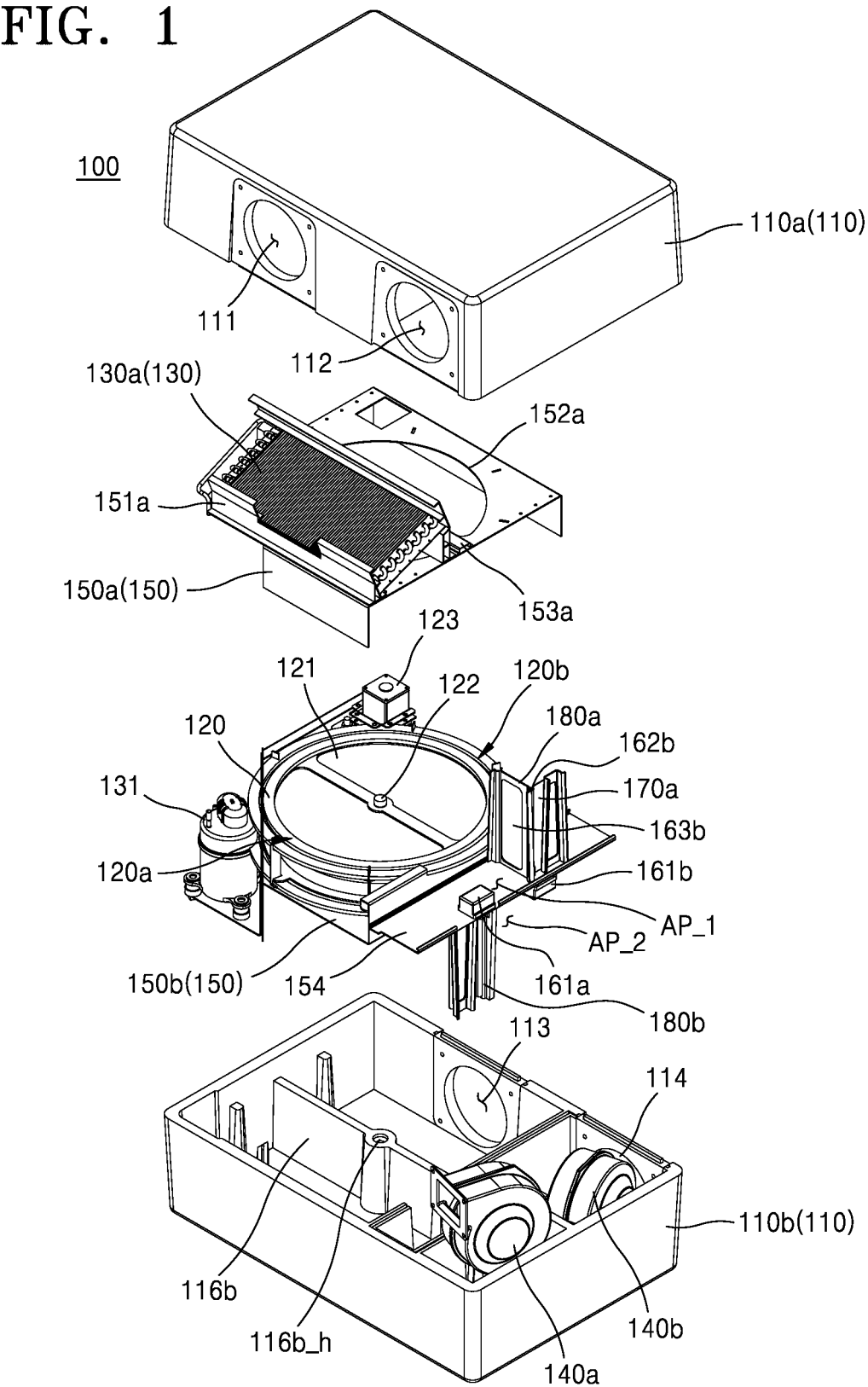
FIG. 1 is a schematic exploded perspective view of elements of an air conditioning system according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The advantages and features of the present invention and methods of achieving the advantages and features will be described more fully with reference to the accompanying drawings, in which exemplary embodiments of the inventive concept are shown. The inventive concept may, however, be embodied in many different forms and should not be construed as being limited to the embodiments set forth herein; rather these embodiments are provided so that this disclosure will be thorough and complete, and will fully convey the concept of the inventive concept to one of ordinary skill in the art.

Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

It will be understood that, although the terms first, second, etc. may be used herein to describe various elements, these elements should not be limited by these terms. These terms are only used to distinguish one element from another.

Figure 2:
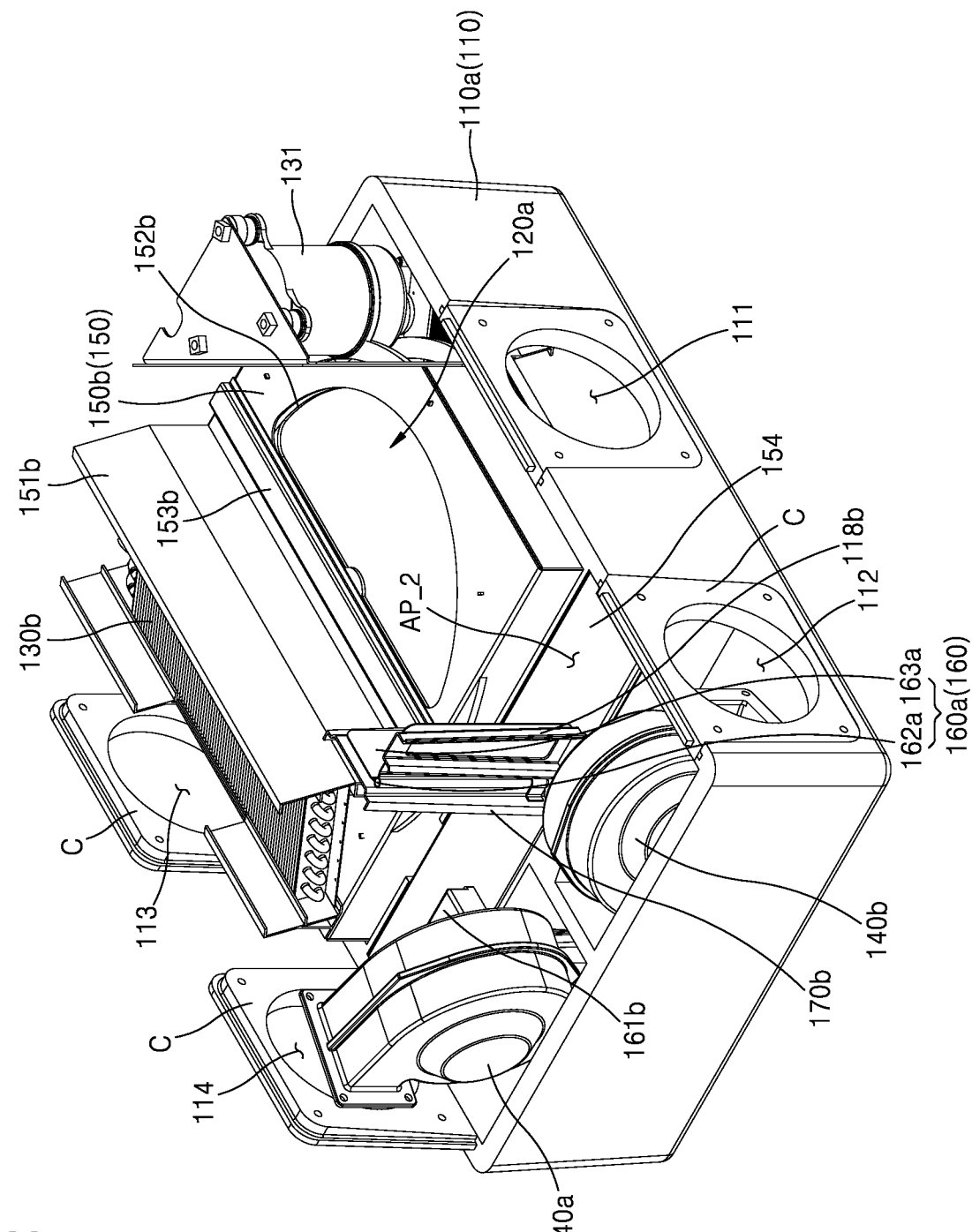
FIG. 2 is a perspective view illustrating a state in which the elements of the air conditioning system of FIG. 1 are assembled, except for a second sub-case.
Figure 3:
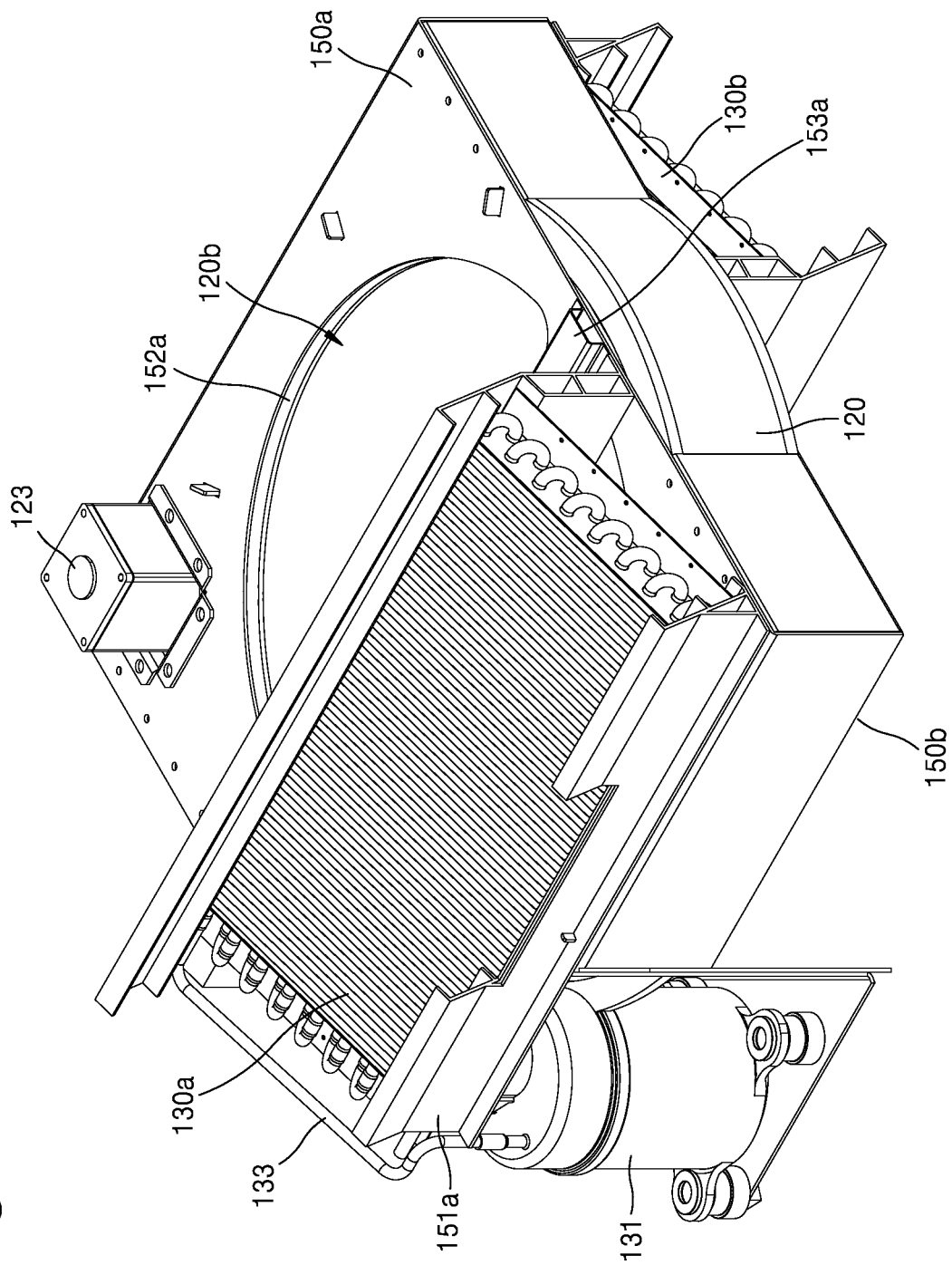
FIG. 3 is a perspective view separately illustrating a desiccant rotor module, a heat exchanger, and a ventilator of the air conditioning system of FIG. 1.
Figure 4:
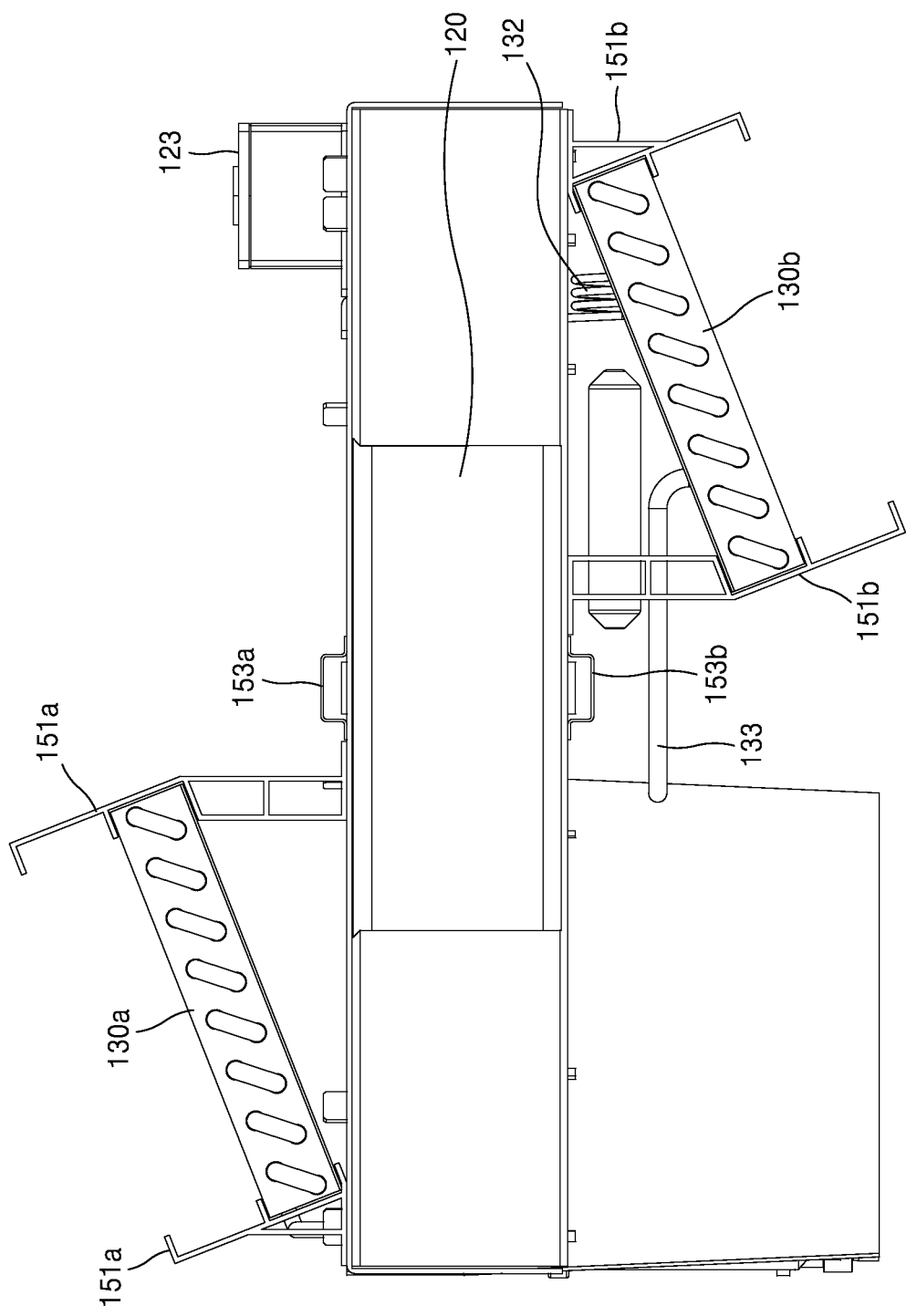
FIG. 4 is a side view of the desiccant rotor module, the heat exchanger, and the ventilator of FIG. 3.
Figure 5:
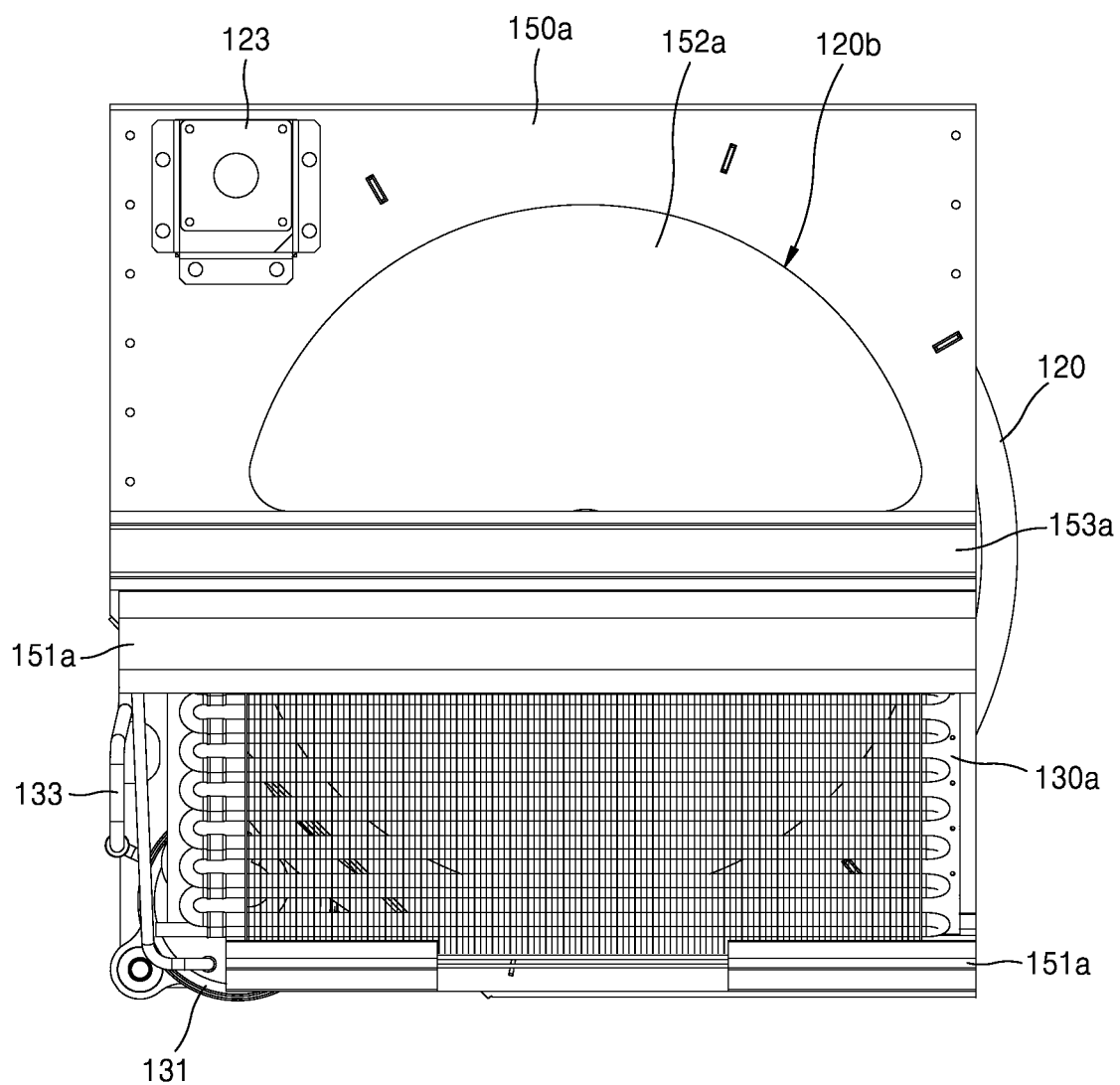
FIG. 5 is a plan view illustrating the elements of the desiccant rotor module, the heat exchanger, and the ventilator of FIG. 4, other than the ventilator.
Figure 6:
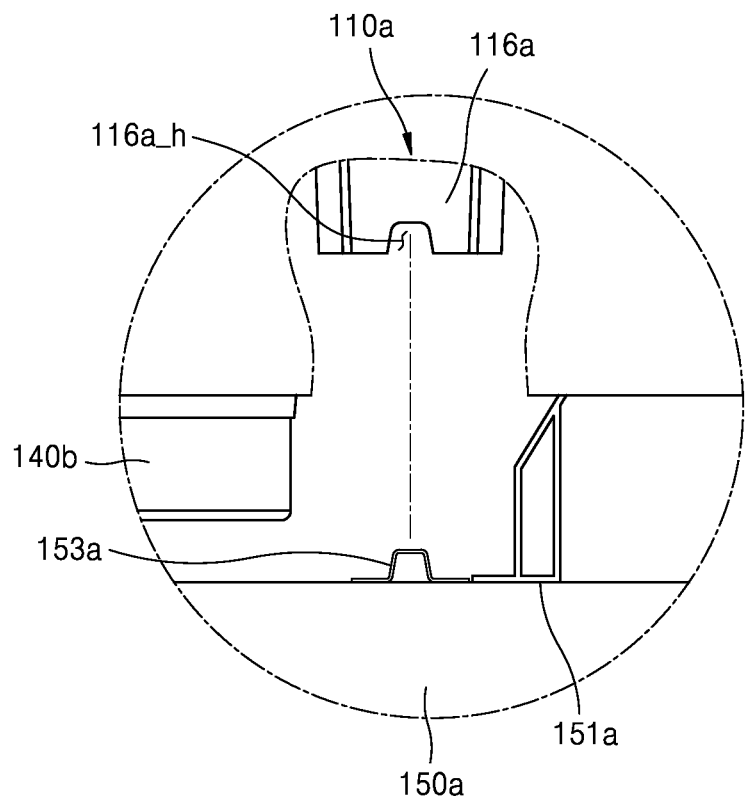
FIG. 6 is a separated side view of a structure of a first separation plate and a first protrusion when assembled.
Figure 7:
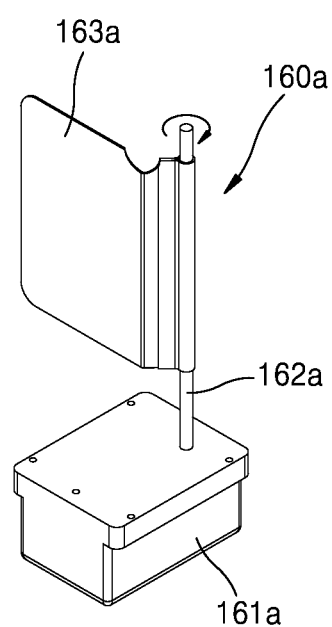
FIG. 7 is a perspective view illustrating a damper installed on an air flow path partitioning plate illustrated in FIG. 2.

FIG. 1 is a schematic exploded perspective view of elements of an air conditioning system according to an embodiment of the present disclosure. FIG. 2 is a perspective view illustrating an assembled state of the elements in the air conditioning system of FIG. 1, except a second sub-case. FIG. 3 is a perspective view separately illustrating a desiccant rotor module, a heat exchanger, and a ventilator in the air conditioning system of FIG. 1. FIG. 4 is a side view of the desiccant rotor module, the heat exchanger, and the ventilator of FIG. 3. FIG. 5 is a plan view illustrating the elements of the desiccant rotor module, the heat exchanger, and the ventilator of FIG. 4, except the ventilator. FIG. 6 is a separated side view of an assembled structure of a first separation plate and a first protrusion. FIG. 7 is a perspective view illustrating a damper installed on an air flow path partitioning plate illustrated in FIG. 2.

The air conditioning system 100 according to an embodiment of the present disclosure illustrated in FIGS. 1 and 2 includes a case 110, a desiccant rotor module 120, a heat exchanger 130, a ventilator 140, a fixing plate 150, a damper 160, an air supply gate 170, an air discharge gate 180, and a controller 190.

The case 110 is hollow, and may be divided into a plurality of regions via a plurality of partitions (not shown). An indoor air from indoors and an outdoor air from the outside may flow in the plurality of divided regions. However, due to the structural characteristics of the air conditioning system 100 described below, the outdoor air and the indoor air flowing in the case 110 may not mix with each other but flow individually.

In detail, the case 110 may include a first sub-case 110a including an outdoor air inlet 111 and a discharge outlet 112 and a second sub-case 110b including an air returning inlet 113 and an air supply inlet 114. The first sub-case 110a and the second sub-case 110b may have an identical shape, and the first sub-case 110a and the second sub-case 110b may be coupled to each other in a vertically and diagonally symmetrical manner. According to this structure, the first sub-case 110a and the second sub-case 110b may be manufactured in a single mold, which means that the manufacturing time and costs are saved.

For example, when viewing the second sub-case 110b from a perspective that the outdoor air inlet 111 and the discharge outlet 112 are arranged at a first side of the first sub-case 110a, the air returning inlet 113 and the air supply inlet 114 may be arranged at a second side of the second sub-case 110b with respect to the second sub-case 110b. As the first sub-case 110a and the second sub-case 110b have the same shape, from a perspective of the second sub-case 110b, the air returning inlet 113 and the air supply inlet 114 may be regarded as being arranged at a first side of the second sub-case 110b.

Although not illustrated in the drawing, the first sub-case 110a includes a portion of the outdoor air inlet 111, the discharge outlet 112, the air returning inlet 113, and the air supply inlet 114, and the second sub-case 110b may include another portion of the outdoor air inlet 111, the discharge outlet 112, the air returning inlet 113, and the air supply inlet 114. That is, as illustrated in the drawing, the outdoor air inlet 111, the discharge outlet 112, the air returning inlet 113, and the air supply inlet 114 may be respectively formed in the first sub-case 110a and the second sub-case 110b, or may be formed to be included in both the first sub-case 110a and the second sub-case 110b. However, for convenience of description, the description will below focus on an embodiment in which the outdoor air inlet 111 and the discharge outlet 112 are formed in the first sub-case 110a, and the air returning inlet 113 and the air supply inlet 114 are formed in the second sub-case 110b.

Meanwhile, although not illustrated in the drawings, the first sub-case 110a and the second sub-case 110b may be coupled to each other via screw coupling through coupling holes (not shown) respectively formed in corners of the first sub-case 110a and the second sub-case 110b, and may each include a receiving recess (not shown) and a coupling protrusion (not shown) to be coupled to each other in a fitting manner. However, the embodiments of the present disclosure are not limited thereto, and they may also be coupled using other methods. When the first sub-case 110a and the second sub-case 110b are manufactured in an identical shape and arranged to face each other, as the same structures are placed to face each other as illustrated in FIG. 1, coupling them to each other may be easy as clearly shown in FIGS. 9 and 11.

In addition, the first sub-case 110a may further include at least one first opening 115a, and the second sub-case 110b may further include at least one second opening 115b. The first opening 115a and the second opening 115b may be formed in side surfaces of the first sub-case 110a and the second sub-case 110b where the outdoor air inlet 111, the discharge outlet 112, the air returning inlet 113, and the air supply inlet 114 are not formed.

For example, the first opening 115a and the second opening 115b may replace the outdoor air inlet 111, the discharge outlet 112, the air returning inlet 113, and the air supply inlet 114, and in a case where a direction of a duct D is to be modified depending on the surroundings where the air conditioning system 100 is installed, the first opening 115a and the second opening 115b may be used as at least one of the outdoor air inlet 111, the discharge outlet 112, the air returning inlet 113, and the air supply inlet 114.

Accordingly, if a duct D is installed in the first opening 115a and the second opening 115b, a blocking plate B may be installed in at least one of the outdoor air inlet 111, the discharge outlet 112, the air returning inlet 113, and the air supply inlet 114 that replaces the first opening 115a or the second opening 115b to thereby block an air flow.

In addition, the first sub-case 110a may include a first separation plate 116a (see FIG. 6) that is installed between a first sub-heat exchanger 130a and a second region 120b of the desiccant rotor module 120 and divides between the first sub-heat exchanger 130a and the second region 120b of the desiccant rotor module 120 so as to prevent mixture between an outdoor air passing through the first sub-heat exchanger 130a and an indoor air passing through the second region 120b of the desiccant rotor module 120.

In addition, the second sub-case 110b may include a second separation plate 116b that is installed between a second sub-heat exchanger 130b and a first region 120a of the desiccant rotor module 120 and divides between the second sub-heat exchanger 130b and the first region 120a of the desiccant rotor module 120 so as to prevent mixture between an indoor air passing through the second sub-heat exchanger 130b and an outdoor air passing through the first region 120a of the desiccant rotor module 120.

Here, the first separation plate 116a has the same structure as the second separation plate 116b illustrated in FIG. 1, and may be formed inside the first sub-case 110a facing the second separation plate 116b (see FIG. 6). That is, the first separation plate 116a and the second separation plate 116b may respectively divide internal space of the case 110 such that an outdoor air and an indoor air do not mix with each other in the first sub-case 110a and the second sub-case 110b. However, in FIGS. 9 and 11 below, the first separation plate 116a and the second separation plate 116b are omitted to clearly illustrate the flows of the outdoor air and the indoor air.

The desiccant rotor module 120 includes a moisture absorbing material. For example, the desiccant rotor module 120 may be manufactured using silica gel or a porous polymer desiccant material formed of a polymer material. In particular, a polymer material has higher moisture absorption performance than silica gel by about four times, and thus, a weight of the desiccant rotor module 120 may be reduced to ¼ thereof such that the polymer material may be appropriate for implementing the desiccant rotor module 120 which is to rotate at a high speed.

In detail, the desiccant rotor module 120 may be installed in the case 110, and is rotatable about a rotational shaft 122 extending in a direction across a coupling surface between the first sub-case 110a and the second sub-case 110b.

The rotational shaft 122 may be installed on the desiccant rotor module 120 to protrude from both surfaces of the desiccant rotor module 120, that is, one surface of the desiccant rotor module 120 facing the first sub-case 110a and the other surface of the desiccant rotor module 120 facing the second sub-case 110b, by a predetermined distance toward the first sub-case 110a and the second sub-case 110b, and a rotational groove receiving the rotational shaft 122 may be formed in each of the first sub-case 110a and the second sub-case 110b (a portion of a second receiving portion 116b_h which is illustrated in FIG. 1 and will be described later). The rotational shaft 122 may rotate by receiving a driving force from a driver 123.

The heat exchanger 130 may include the first sub-heat exchanger 130a that is installed in a path through which an outdoor air entering the first sub-case 110a through the outdoor air inlet 111 moves to the first region 120a of the desiccant rotor module 120 and through which a heat transfer medium (coolant) for heat exchange flows and the second sub-heat exchanger 130b that is installed in a path through which an indoor air entering the second sub-case 110b through the air returning inlet 113 moves to the second region 120b opposite the first region 120a of the desiccant rotor module 120 with respect to the rotational shaft 122 and through which a heat transfer medium (coolant) for heat exchange flows.

Here, the first sub-heat exchanger 130a may be a condenser through which a heat source flows, so as to heat outdoor air flowing into the outdoor air inlet 111, and the second sub-heat exchanger 130b may be an evaporator through which a cold heat source flows to cool indoor air entering through the air returning inlet 113.

In more detail, if the first sub-heat exchanger 130a is a condenser, moisture contained in the first region 120a of the desiccant rotor module 120 may evaporate via the outdoor air that is heated by passing through the first sub-heat exchanger 130a. That is, in the first region 120a of the desiccant rotor module 120, a regeneration of the desiccant rotor module 120 may be performed.

Meanwhile, if the second sub-heat exchanger 130b is an evaporator, the second region 120b of the desiccant rotor module 120 may adsorb vapor in the indoor air that has cooled by passing through the second sub-heat exchanger 130b. That is, in the second region 120b of the desiccant rotor module 120, the desiccant rotor module 120 may perform desiccant.

Here, a portion of the vapor contained in the indoor air that has entered through the air returning inlet 113 may be condensed on a surface of the second sub-heat exchanger 130b and formed as water drops on the surface of the second sub-heat exchanger 130b. As the second sub-heat exchanger 130b operates as an evaporator as described above, although not illustrated in the drawing, the water drops formed on the surface of the second sub-heat exchanger 130b may be transferred from the second sub-heat exchanger 130b to a first sub-ventilator 140a through a condensate discharge pipe 130c connecting the second sub-heat exchanger 130b and an outlet 141a of the first ventilator 140a, and then transferred to the discharge outlet 112 to be discharged to the outside with the outdoor air.

In addition, the outdoor air that is humidified by passing through the first region 120a of the desiccant rotor module 120 may be discharged to the outside through the discharge outlet 112. That is, the outdoor air that has entered through the outdoor air inlet 111 is heated by passing through the first sub-heat exchanger 130a, and then enters the first region 120a of the desiccant rotor module 120 to evaporate moisture contained in the first region 120a, and at the same time is guided to the discharge outlet 112 in a somewhat cooled state by latent heat of vaporization so as to be discharged outside through the discharge outlet 112.

The flow of the outdoor air described above occurs if the first sub-heat exchanger 130a operates as a condenser. While it will be described later, if the first sub-heat exchanger 130a stops operating, and a rotational speed of the desiccant rotor module 120 increases, the outdoor air may be guided to the air supply inlet 114, instead of the discharge outlet 112. This guiding will be described in more detail later with reference to description of operations of the fixing plate 150, an air flow path partitioning plate 154 of the fixing plate 150, an air supply gate 170 and an air discharge gate 180 mounted in the air flow path partitioning plate 154, and a damper 160.

Meanwhile, the indoor air that is cooled by passing the second region 120b of the desiccant rotor module 120 may be supplied into indoors through the air supply inlet 114. That is, indoor air that has entered the air returning inlet 113 is cooled by passing through the second sub-heat exchanger 130b, and vapor in the cooled indoor air is adsorbed to the second region 120b of the desiccant rotor module 120, and at the same time, the indoor air that is somewhat heated by adsorption heat may be supplied indoors through the air supply inlet 114 in a finally dehumidified state.

Here, the adsorption heat generated in the second region 120b of the desiccant rotor module 120 falls short of cooling performance of the second sub-heat exchanger 130b, and thus, a temperature of the indoor air supplied into indoors through the air supply inlet 114 is lower than that of the indoor air entering the air returning inlet 113.

The flow of the indoor air described above occurs if the second sub-heat exchanger 130b operates as an evaporator. While it will be described later, if the second sub-heat exchanger 130b stops operating, and a rotational speed of the desiccant rotor module 120 increases, the indoor air may be guided to the discharge outlet 112, instead of the air supply inlet 114. This guiding will be described in more detail later with reference to description of operations of the fixing plate 150, the air flow path partitioning plate 154 of the fixing plate 150, the air supply gate 170 and the air discharge gate 180 mounted in the air flow path partitioning plate 154, and the damper 160.

Thus, in sum, if the first sub-heat exchanger 130a and the second sub-heat exchanger 130b respectively operate as a condenser and an evaporator, the outdoor air that has flowed into the air conditioning system 100 flows into the air conditioning system 100 to regenerate the first region 120a of the desiccant rotor module 120, and the indoor air flows into the air conditioning system 100 to be dehumidified and cooled and supplied indoors again.

In addition, if operation of the first sub-heat exchanger 130a and the second sub-heat exchanger 130b is stopped, after the outdoor air has entered the air conditioning system 100, it is supplied indoors through the air supply inlet 114, and the indoor air enters the air conditioning system 100 and then is discharged to the outside through the discharge outlet 112. Thus, a function of ventilation of the indoor air may be performed.

Next, the ventilator 140 may include the first sub-ventilator 140a installed upstream or downstream of the first region 120a of the desiccant rotor module 120 and a second sub-ventilator 140b installed upstream or downstream of the second region 120b of the desiccant rotor module 120. That is, the first sub-ventilator 140a and the second sub-ventilator 140b may be installed at any location in an inner flow path of the case 110 through which outdoor air and indoor air flow. However, for convenience, description will focus on an embodiment in which the first sub-ventilator 140a is installed downstream of the first region 120a of the desiccant rotor module 120, and the second sub-ventilator 140b is installed upstream of the second region 120b of the desiccant rotor module 120 as illustrated in FIG. 1.

The fixing plate 150 may include a first sub-fixing plate 150a that is installed between the first sub-case 110a and the desiccant rotor module 120 and includes a first installation support 151a on which the first sub-heat exchanger 130a is installed and a first ventilation inlet 152a (FIG. 1) providing a path through which the indoor air that has passed through the second region 120b of the desiccant rotor module 120 moves to the discharge outlet 112 or the air supply inlet 114 and a second sub-fixing plate 150b that is installed between the second sub-case 110b and the desiccant rotor module 120 and includes a second installation support 151b on which the second sub-heat exchanger 130b is installed and a second ventilation inlet 152b (FIG. 2) providing a path through which the outdoor air that has passed through the first region 120a of the desiccant rotor module 120 moves to the discharge outlet 112 or the air supply inlet 114.

In addition, the first sub-fixing plate 150a may further include a first protrusion 153a protruding toward the first separation plate 116a of the first sub-case 110a, and the first separation plate 116a may include a first receiving portion 116a_h receiving the first protrusion 153a. This structure is illustrated in detail in FIG. 6. Here, the first protrusion 153a and the first receiving portion 116a_h may be coupled to each other in a fitting manner.

In addition, the second sub-fixing plate 150b may further include a second protrusion 153b protruding toward the second separation plate 116b of the second sub-case 110b, and the second separation plate 116b may include a second receiving portion 116b_h receiving the second protrusion 153b.

As described above, as the first protrusion 153*a* is formed in the first sub-fixing plate 150*a*, and the first receiving portion 116*a*_h receiving the first protrusion 153*a* is formed in the first separation plate 116*a* so that the first protrusion 153*a* and the first receiving portion 116*a*_h are coupled to each other in a fitting manner, outdoor air passing through the first sub-heat exchanger 130*a* and indoor air passing through the second region 120*b* of the desiccant rotor module 120, which respectively flow around the one and the other side of the first separation plate 116*a* may not mix with each other.

Meanwhile, the first sub-case 110*a* may include a first air flow path region AP_1 in which an indoor air discharged from the second region 120*b* of the desiccant rotor module 120 flows and a second air flow path region AP_2 in which an outdoor air discharged from the first region 120*a* of the desiccant rotor module 120 flows.

Here, the fixing plate 150 may further include the air flow path partitioning plate 154 that divides the first air flow path region AP_1 and the second air flow path region AP_2 from each other. That is, the first air flow path region AP_1 and the second air flow path region AP_2 may be disposed opposite each other with the air flow path partitioning plate 154 therebetween.

The air flow path partitioning plate 154 may be installed downstream of the first region 120*a* and the second region 120*b* of the desiccant rotor module 120 to divide a portion of internal space of the first sub-case 110*a* and a portion of internal space of the second sub-case 110*b* from each other. According to this structure, an indoor air flowing through the first air flow path region AP_1 at the first sub-case 110*a* and an outdoor air flowing through the second air flow path region AP_2 at the second sub-case 110*b* may not mix with each other but individually flow in opposite directions to each other on both sides of the air flow path partitioning plate 154.

In detail, a first air supply gate 170*a* guiding the indoor air that has passed through the second region 120*b* of the desiccant rotor module 120 toward the air supply inlet 114 and a first air discharge gate 180*a* guiding the indoor air that has passed through the first region 120*a* of the desiccant rotor module 120 toward the discharge outlet 112 may be installed on the air flow path partitioning plate 154 at the first air flow path region AP_1 (see FIG. 1).

Likewise, a second air supply gate 170*b* guiding the outdoor air that has passed through the first region 120*a* of the desiccant rotor module 120 toward the air supply inlet 114 and a second air discharge gate 180*b* guiding the outdoor air that has passed through the first region 120*a* of the desiccant rotor module 120 toward the discharge outlet 112 may be installed on the air flow path partitioning plate 154 at the second air flow path region AP_2.

The flows of the outdoor air and the indoor air due to the structures of the first air supply gate 170*a*, the first air discharge gate 180*a*, the second air supply gate 170*b*, and the second air discharge gate 180*b* will be described in further detail below with reference to FIGS. 9 through 12.

The damper 160 may include a first sub-damper 160*a* installed downstream of the first region 120*a* of the desiccant rotor module 120 to guide the outdoor air that has passed through the first region 120*a* of the desiccant rotor module 120 to one of the discharge outlet 112 and the air supply inlet 114 and a second sub-damper 160*b* installed downstream of the second region 120*b* of the desiccant rotor module 120 to guide the outdoor air that has passed through the second region 120*b* of the desiccant rotor module 120 to the other of the discharge outlet 112 and the air supply inlet 114.

Referring to FIGS. 1, 2, and 7, the first sub-damper 160*a* may include a first damper driver 161*a* installed on the air flow path partitioning plate 154 at the first air flow path region AP_1, a first damper rotational shaft 162*a* rotatably connected to the first damper driver 161*a* to pass through the air flow path partitioning plate 154 and protrude toward the second air flow path region AP_2, and a first cover plate 163*a* connected to the first damper rotational shaft 162*a* to be movable between a third position P3 (see FIG. 10) where the second air discharge gate 180*b* is closed and a fourth position P4 (see FIG. 10) where the second air supply gate 170*b* is closed.

In addition, the second sub-damper 160*b* has the same structure as the first sub-damper 160*a*, and may include a second damper driver 161*b* installed on the air flow path partitioning plate 154 at the second air flow path region AP_2, a second damper rotational shaft 162*b* rotatably connected to the second damper driver 161*b* to pass through the air flow path partitioning plate 154 and protrude toward the first air flow path region AP_1, and a second cover plate 163*b* connected to the second damper rotational shaft 162*b* to be movable between a first position P1 (see FIG. 12) where the first air supply gate 170*a* is closed and a second position P2 (see FIG. 12) where the first air discharge gate 180*a* is closed.

Figure 8:
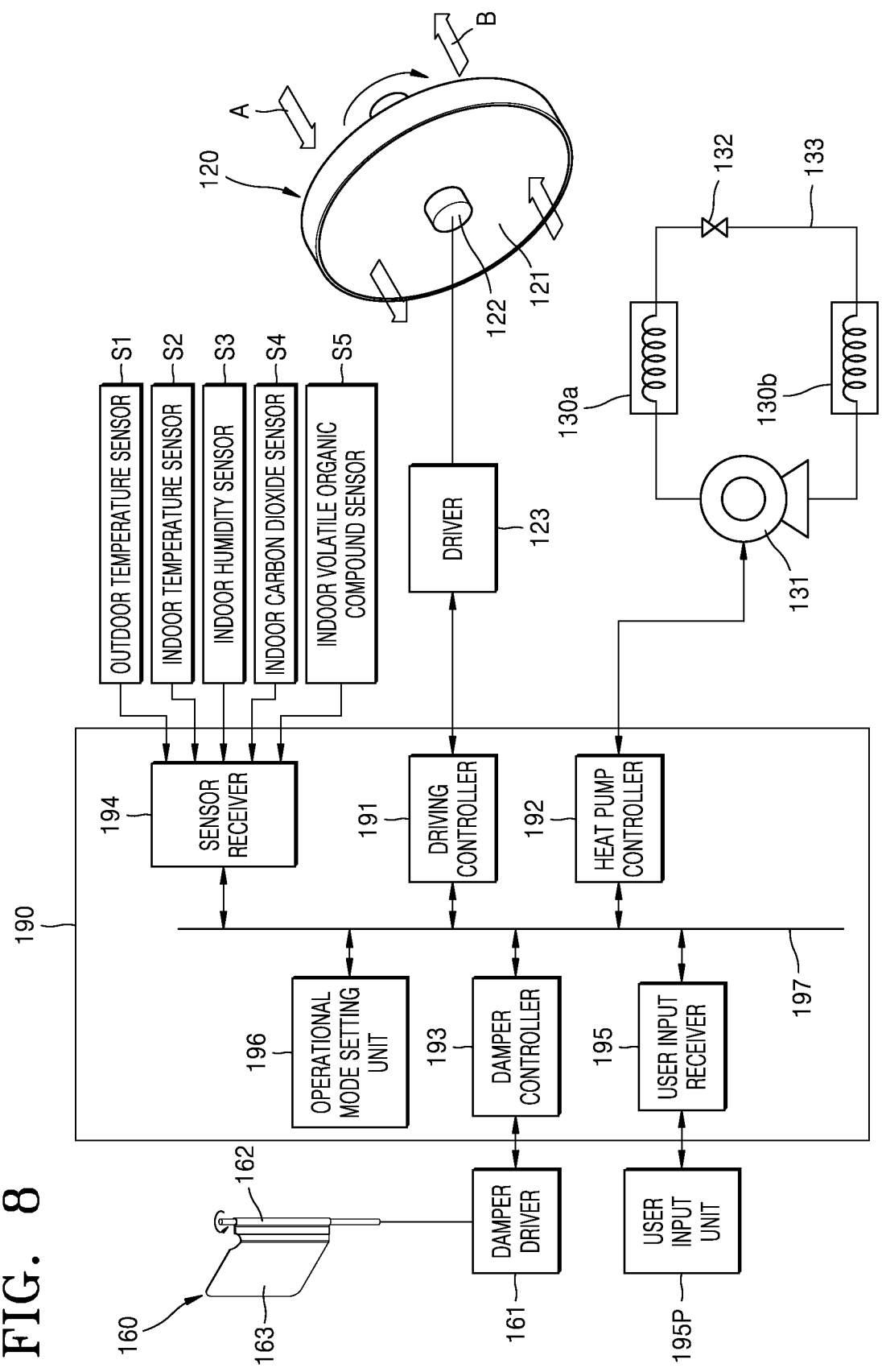
FIG. 8 is a schematic block diagram illustrating a connection relationship between the elements and a controller of the air conditioning system of FIG. 1.

FIG. 8 is a schematic block diagram illustrating a connection relationship between the elements and the controller 190 of the air conditioning system 100 of FIG. 1.

Referring to FIG. 8, the controller 190 may include a driving controller 191 applying a control signal to the desiccant rotor module 120 to control a rotational speed of the desiccant rotor module 120, a heat pump controller 192 applying a control signal to the heat exchanger 130 to control whether to operate the first sub-heat exchanger 130*a* and the second sub-heat exchanger 130*b*, and a damper controller 193 applying a control signal to the damper 160 to control a rotational angle of the first sub-damper 160*a* and the second sub-damper 160*b*.

In detail, the controller 190 may select and execute one of a desiccant mode in which a rotational speed of the desiccant rotor module 120 is controlled at a low speed of a preset range, the first sub-heat exchanger 130*a* and the second sub-heat exchanger 130*b* are actuated, the first sub-damper 160*a* is controlled to guide, to the discharge outlet 112, the outdoor air which has been heated and humidified by passing through the first sub-heat exchanger 130*a* and the first region 120*a* of the desiccant rotor module 120 and ventilated through the first sub-ventilator 140*a*, and the second sub-damper 160*b* is controlled to guide, to the air supply inlet 114, the indoor air which has been cooled and dehumidified by passing through the second sub-heat exchanger 130*b* and the second region 120*b* of the desiccant rotor module 120 and ventilated through the second sub-ventilator 140*b*; a heat recovery ventilation mode in which a rotational speed of the desiccant rotor module 120 is controlled at a high speed of a preset range, operations of the first sub-heat exchanger 130*a* and the second sub-heat exchanger 130*b* are stopped, the first sub-damper 160*a* is controlled to guide, to the air supply inlet 114, the outdoor air which has undergone total heat exchange with the indoor air passing through the second region 120*b* of the desiccant rotor module 120 while the outdoor air passes through the first region 120*a* of the desiccant rotor module 120, and then ventilated through the first sub-ventilator 140*a*, and the second sub-damper 160b is controlled to guide, to the air supply inlet 114, the indoor air which has undergone total heat exchange with the outdoor air passing through the first region 120a of the desiccant rotor module 120 while the indoor air passes through the second region 120b of the desiccant rotor module 120, and then ventilated through the second sub-ventilator 140b; and an outdoor air cooling mode in which operation of the desiccant rotor module 120 is stopped, operations of the first sub-heat exchanger 130a and the second sub-heat exchanger 130b are stopped, the first sub-damper 160a is controlled to guide low-temperature outdoor air to the air supply inlet 114 through the first sub-ventilator 140a, and the second sub-damper 160b is controlled to guide high-temperature indoor air to the discharge outlet 112 through the second sub-ventilator 140b.

The driving controller 191 may control a rotational speed of the driver 123 by applying a control signal to the driver 123 that provides a rotational driving force to the desiccant rotor module 120. That is, if the controller 190 drives the air conditioning system 100 in a desiccant mode, the driving controller 191 may control the driver 123 at a low speed of a preset range. In addition, if the controller 190 drives the air conditioning system 100 in a heat recovery ventilation mode, the driving controller 191 may control the driver 123 at a high speed of a preset range. In addition, if the controller 190 drives the air conditioning system 100 in an outdoor air cooling mode, the driving controller 191 may stop the driver 123.

Here, the 'preset range' refers to a predetermined rotational speed that is preset during the manufacture of the air conditioning system 100 or by a user. Here, the 'low speed' indicates a relatively low speed compared to the 'high speed' at which the desiccant rotor module 120 rotates in a heat recovery ventilation mode of the air conditioning system 100 which will be described later, and does not refer to any particular value. That is, as will be described later, in a desiccant mode, a rotational speed of the desiccant rotor module 120 may be set proportionally to a difference in set values of indoor and outdoor relative humidity, a carbon dioxide concentration of the indoor air, a volatile organic compound concentration, and a difference in set values of a carbon dioxide concentration and a total volatile organic compounds (TVOC) concentrations. As the rotational speed of the desiccant rotor module 120 is varied, characteristics of physical phenomena occurring between the desiccant rotor module 120 and the indoor air I and the outdoor air O that pass through a pore portion 121 including a porous desiccant material of the desiccant rotor module 120 may change.

The heat pump controller 192 may control whether to operate the first sub-heat exchanger 130a and the second sub-heat exchanger 130b by applying a control signal to the heat exchanger 130. In detail, the heat exchanger 130 may include a compressor 131, the first sub-heat exchanger 130a, the second sub-heat exchanger 130b, and an expansion member 132, which may be connected to one another via a heat transfer medium pipe 133. A heat transfer medium (coolant) for heat exchange flows in the heat transfer medium pipe 133, and according to whether the compressor 131 is driven, whether to effect heat exchange in the first sub-heat exchanger 130a and the second sub-heat exchanger 130b may be determined.

In detail, the heat pump controller 192 may apply a control signal to the compressor 131 of the heat exchanger 130. Thus, when the controller 190 drives the air conditioning system 100 in a desiccant mode, the heat pump controller 192 may apply a driving signal to the compressor 131 so as to allow each of the first sub-heat exchanger 130a and the second sub-heat exchanger 130b to operate as a condenser or an evaporator. In addition, if the controller 190 drives the air conditioning system 100 in a heat recovery ventilation mode or an outdoor air cooling mode, the heat pump controller 192 may apply no driving signal to the compressor 131 so as to stop operation of the heat exchanger 130.

The damper controller 193 may apply a control signal to the damper driver 161 to control a rotational angle of the first sub-damper 160a and the second sub-damper 160b. The damper driver 161 may be implemented using an electric motor operating according to an electrical signal, and by driving the damper driver 161, a cover plate 163 may be rotated to a position for opening or closing the air supply gate 170 or the air discharge gate 180, thereby guiding an indoor air and an outdoor air to the discharge outlet 112 or to the air supply inlet 114.

In detail, if the controller 190 drives the air conditioning system 100 in a desiccant mode, the damper controller 193 may control the first damper driver 161a to locate the first cover plate 163a in the fourth position P4 where the second air discharge gate 180b is opened and the second air supply gate 170b is closed, to thereby guide the outdoor air that has passed through the first region 120a of the desiccant rotor module 120, to the discharge outlet 112. At the same time, the damper controller 193 may control the second damper driver 161b to locate the second cover plate 163b in the second position P2 where the first air supply gate 170a is opened and the first air discharge gate 180a is closed, to thereby guide the indoor air that has passed through the second region 120b of the desiccant rotor module 120, to the air supply inlet 114.

In addition, if the controller 190 drives the air conditioning system 100 in a heat recovery ventilation mode or an outdoor air cooling mode, the damper controller 193 may control the first damper driver 161a to locate the first cover plate 163a in the third position P3 where the second air discharge gate 180b is closed and the second air supply gate 170b is opened, to thereby guide the outdoor air that has passed through the first region 120a of the desiccant rotor module 120, to the air supply inlet 114. At the same time, the damper controller 193 may control the second damper driver 161b to locate the second cover plate 163b in the first position P1 where the first air supply gate 170a is closed and the first air discharge gate 180a is opened, to thereby guide the indoor air that has passed through the second region 120b of the desiccant rotor module 120, to the discharge outlet 112.

Meanwhile, although not illustrated in FIGS. 1 through 5, the air conditioning system 100 according to the embodiments of the present disclosure may further include, for the purpose of controlling the elements of the air conditioning system 100, an outdoor temperature sensor 51 installed at the outdoor air inlet 111 to sense a temperature of an outdoor air entering through the outdoor air inlet 111, an indoor temperature sensor S2 installed at the air returning inlet 113 to sense a temperature of an indoor air entering through the air returning inlet 113, an indoor humidity sensor S3 installed at the air returning inlet 113 to sense a relative humidity of an indoor air entering through the air returning inlet 113, and an indoor carbon dioxide sensor S4 installed at the air returning inlet 113 to sense a carbon dioxide ($CO_2$) concentration of an indoor air entering through the air returning inlet 113, and an indoor volatile organic compound sensor S5 installed at the air returning inlet 113 to sense a total volatile organic compounds (TVOC) concentrations of an indoor air entering through the air returning inlet 113. At least one of the indoor temperature sensor S2, the indoor humidity sensor S3, the indoor carbon dioxide sensor S4, and the indoor volatile organic compound sensor S5 may be installed at the air returning inlet 113, but the embodiments of the present disclosure are not limited thereto, and the at least one of the sensors may be installed, for example, directly in indoor space. That is, if the air conditioning system 100 is to be controlled according to a temperature or humidity or a concentration of a volatile organic compound of a particular location in indoor space, the at least one of the indoor temperature sensor S2, the indoor humidity sensor S3, the indoor carbon dioxide sensor S4, and the indoor volatile organic compound sensor S5 may be installed indoors at any other location instead of the air returning inlet 113.

The controller 190 may further include a sensor receiver 194 receiving an outdoor air temperature, an indoor air temperature, a relative humidity of an indoor air, a carbon dioxide concentration of an indoor air, and a volatile organic compound concentration of an indoor air respectively sensed using the indoor temperature sensor S2, the indoor humidity sensor S3, the indoor carbon dioxide sensor S4, and the indoor volatile organic compound sensor S5.

In addition, the air conditioning system 100 may further include a user input unit 195p receiving, from a user, a user input signal used to select one of the desiccant mode, the heat recovery ventilation mode, and the outdoor air cooling mode, and a set value of an indoor relative humidity, a set value of an indoor carbon dioxide concentration, a set value of an indoor volatile organic compound concentration, and a set value of a comfortable indoor cooling temperature (hereinafter, all these values are referred to as 'user set values') from a user to generate a control signal.

In detail, the user input unit 195p performs the function of selecting an operational mode for operating the air conditioning system 100. For example, the user input unit 195p may be implemented using a remote controller connected to the controller 190 via wireless or wired communication conducted by using, for example, an infrared signal.

In addition, the controller 190 may further include a user input receiver 195 that receives a user input signal for selecting an operational mode and a user set value and stores the same.

In addition, the controller 190 may further include an operational mode setting unit 196. The operational mode setting unit 196 may be electrically connected to the elements in the controller 190, and may set an operational mode of the air conditioning system 100 based on a user input signal and a user set value received via the user input unit 195p or set an operational mode based on a sensor signal received via the sensor receiver 194.

For example, if a relative humidity of an indoor air received via the sensor receiver 194 is 110% more of a set value of an indoor relative humidity stored in the user input receiver 195, the controller 190 may execute a desiccant mode via the operational mode setting unit 196. A rotational speed of the desiccant rotor module 120, here, may be proportional to a set value of the indoor air relative humidity received by the sensor receiver 194 and a set value of the indoor relative humidity stored in the user input receiver 195.

As another example, if an indoor air carbon dioxide concentration received via the sensor receiver 194 is higher than a set value of an indoor carbon dioxide concentration stored in the user input receiver 195, or if a volatile organic compound concentration of an indoor air received by the sensor receiver 194 is higher than a set value of a volatile organic compound concentration of indoor air stored in the user input receiver 195, the controller 190 may execute a heat recovery ventilation mode. A rotational speed of the desiccant rotor module 120, here, may be proportional to a difference between an indoor air carbon dioxide concentration and a set value of the indoor carbon dioxide concentration or a difference between a volatile organic compound concentration of an indoor air and a set value of an indoor volatile organic compound concentration.

Control of the rotational speed of the desiccant rotor module 120 may be modified by controlling the driver 123 according to a control signal applied to the desiccant rotor module 120 through the driving controller 191 based on various measurement values received by the sensor receiver 194 and the set values stored in the user input receiver 195.

As another example, the controller 190 may execute an outdoor air cooling mode if a temperature of an outdoor air received via the sensor receiver 194 is lower than an indoor air temperature, and at the same time, an indoor air temperature received via the sensor receiver 194 is higher than a set value of an indoor cooling comfortable temperature stored in the user input receiver 195.

The controller 190 as described above may be implemented using a computer, a control board including a semiconductor chip and a circuit board or the like, or a software-embedded semiconductor chip. In addition, elements of the controller 190 may be implemented using an additional control board, or software embedded in a computer, a control board, or a semiconductor chip.

Hereinafter, a flow path of an outdoor air and an indoor air flowing in the air conditioning system 100 will be described in detail with reference to FIGS. 9 through 12.

Figure 9:
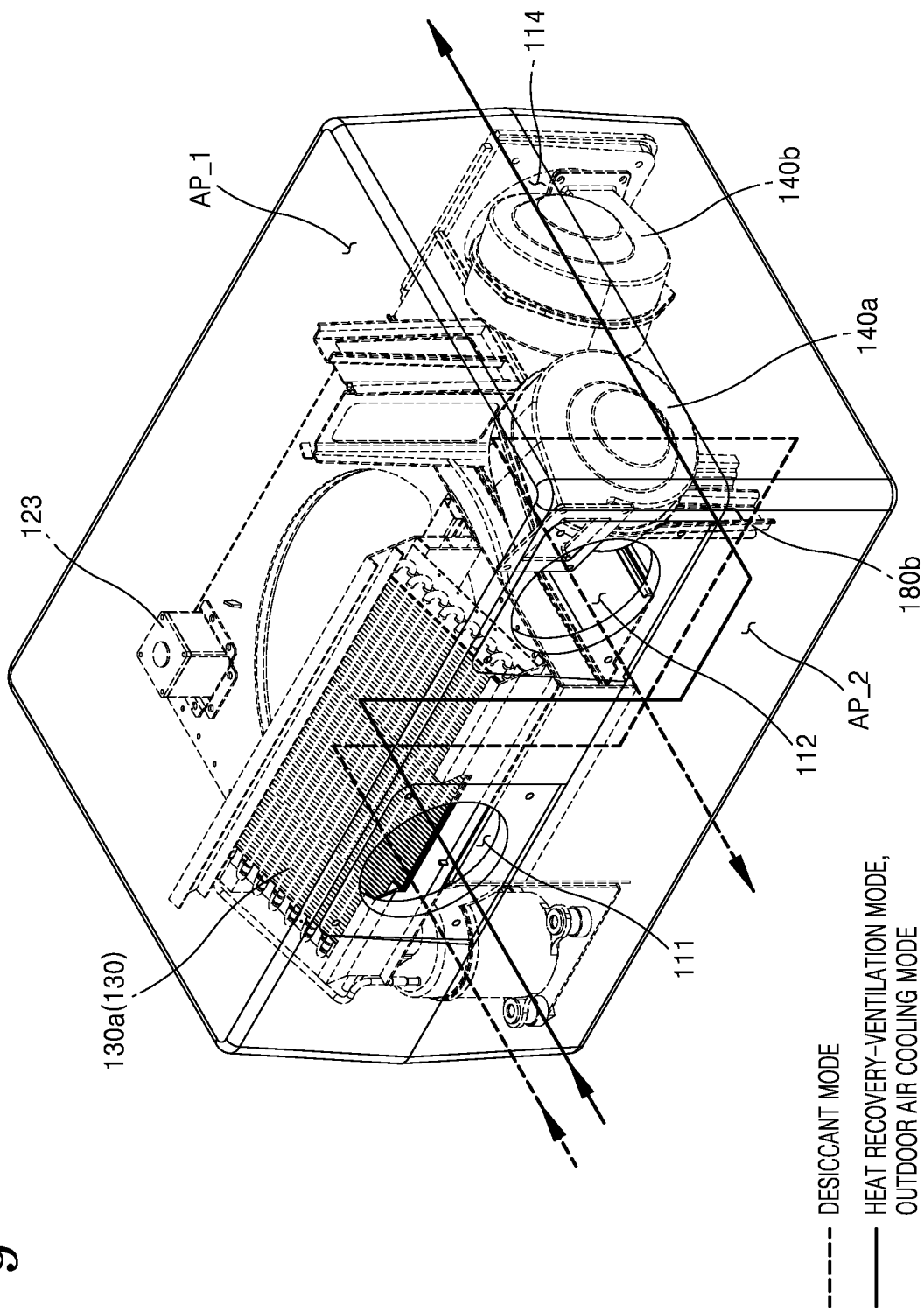
FIG. 9 is a perspective view illustrating a path through which outdoor air that has entered the air conditioning system of FIG. 1 flows inside the air conditioning system.
Figure 10:
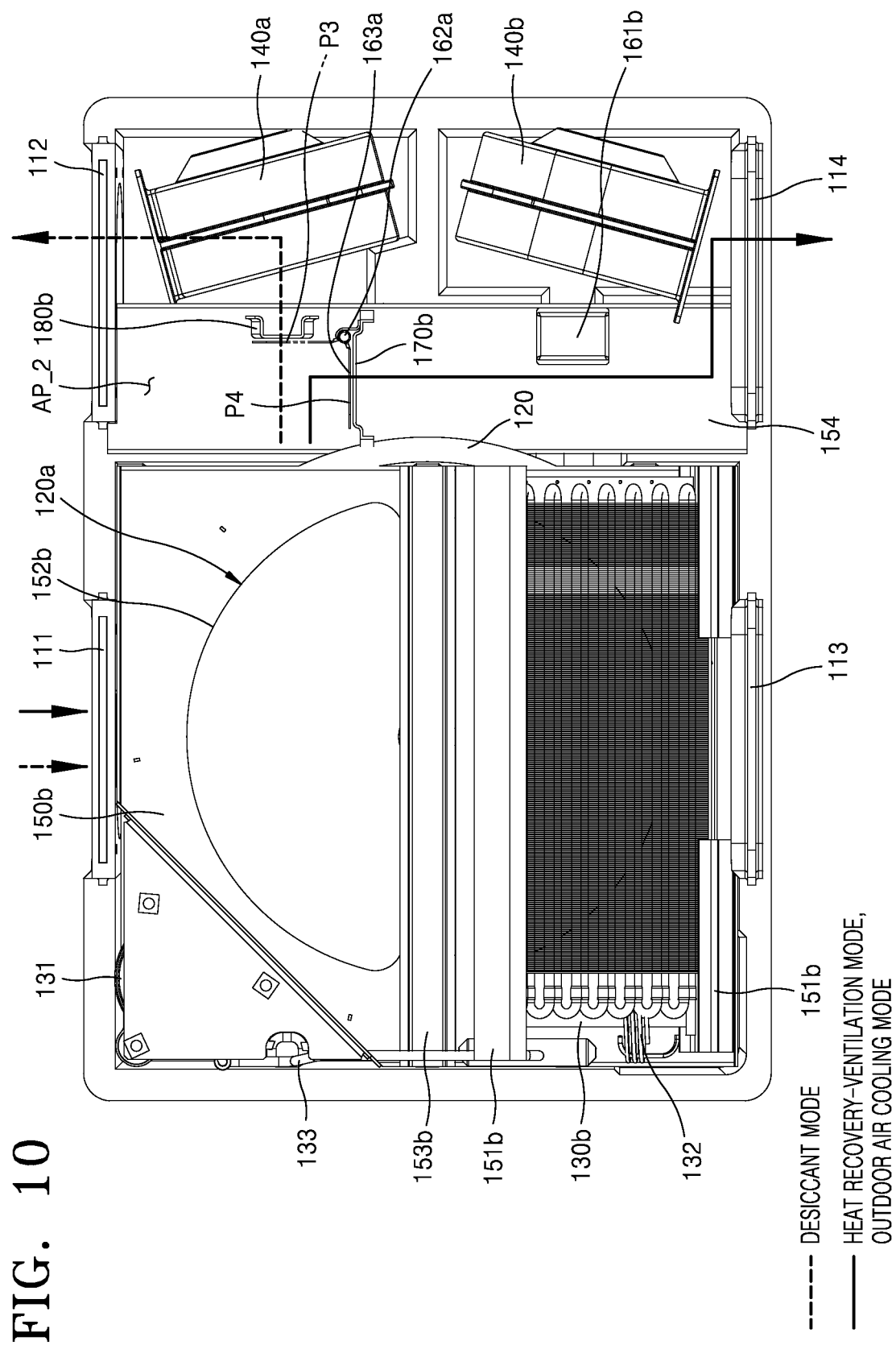
FIG. 10 is an exploded plan view of the air conditioning system of FIG. 9, from which a second sub-case is removed, illustrating a path through which outdoor air which has entered the air conditioning system flows inside the air conditioning system.

FIG. 9 is a perspective view illustrating a path, through which an outdoor air that has entered the air conditioning system 100 of FIG. 1 flows inside the air conditioning system. FIG. 10 is an exploded plan view of the air conditioning system 100 of FIG. 9, from which the second sub-case 110b is removed, to illustrate a path through which an outdoor air, which has entered the air conditioning system 100, flows inside the air conditioning system 100.

The flow path of the outdoor air shown in FIGS. 9 and 10 may include i) a desiccant mode denoted by a dotted line and ii) a heat recovery ventilation mode or an outdoor air cooling mode denoted by a solid line.

First, if the air conditioning system 100 is driven in a desiccant mode, the outdoor air may enter the first sub-case 110a through the outdoor air inlet 111. The outdoor air that has entered the first sub-case 110a at the outdoor air inlet 111 may be heated by passing through the first sub-heat exchanger 130a, and the heated outdoor air may flow to the first region 120a of the desiccant rotor module 120. Moisture contained in the first region 120a of the desiccant rotor module 120 is evaporated by the heated outdoor air, and due to latent heat of vaporization of the moisture, the outdoor air may be cooled to a predetermined temperature.

After being heated by passing through the first sub-heat exchanger 130a, the outdoor air is cooled again by passing through the first region 120a of the desiccant rotor module 120. However, as cooling effects due to the desiccant rotor module 120 are relatively small compared to the heating effects due to the first sub-heat exchanger 130a, consequently, the outdoor air that passes through the first region 120a of the desiccant rotor module 120 to move toward the first sub-ventilator 140a may be in a humidified and heated state compared to a state thereof before entering the air conditioning system 100. As described above, the outdoor air that is humidified and heated by passing through the first region 120*a* of the desiccant rotor module 120 may enter the second air flow path region AP_2.

Here, if the air conditioning system 100 is driven in a desiccant mode, the first sub-damper 160*a* is located in the fourth position P4 where the second air supply gate 170*b* is closed and the second air discharge gate 180*b* is opened. Accordingly, the outdoor air that is heated and humidified by passing through the first sub-heat exchanger 130*a* and the first region 120*a* of the desiccant rotor module 120 may pass through the second air discharge gate 180*b* to be discharged again to the outside through the discharge outlet 112.

If the air conditioning system 100 is driven in a heat recovery ventilation mode, the operation of the heat exchanger 130 is stopped as described above, and thus, the outdoor air passes through the first sub-heat exchanger 130*a* without temperature change, and then while the outdoor air passes through the first region 120*a* of the desiccant rotor module 120, the outdoor air may maintain a similar temperature as a temperature of an indoor air through total heat exchange with the indoor air passing through the second region 120*b*. In this state, the outdoor air may enter the second air flow path region AP_2 through the first sub-ventilator 140*a*. This indicates that total heat exchange between an indoor air and an outdoor air may be performed just by rotating the desiccant rotor module 120, without including an additional total heat exchanger.

If the air conditioning system 100 is driven in an outdoor air cooling mode, not only the heat exchanger 130 but the desiccant rotor module 120 also stops operating, and thus, the outdoor air that has entered through the outdoor air inlet 111 may enter the second air flow path region AP_2 without undergoing total heat exchange with indoor air as described above, that is, unchanged.

Meanwhile, if the air conditioning system 100 is driven in ii) a heat recovery ventilation mode or an outdoor air cooling mode, the first sub-damper 160*a* is located in the third position P3 where the second air discharge gate 180*b* is closed and the second air supply gate 170*b* is opened. Accordingly, the outdoor air ventilated through the first sub-ventilator 140*a* may pass through the second air supply gate 170*b* to be guided toward the air supply inlet 114 along the second air flow path region AP_2, and then may be supplied into indoors through the air supply inlet 114. That is, in the heat recovery ventilation mode, the outdoor air may be supplied indoors after undergoing total heat exchange with indoor air, and in the outdoor air cooling mode, the outdoor air may be supplied indoors unchanged.

Figure 11:
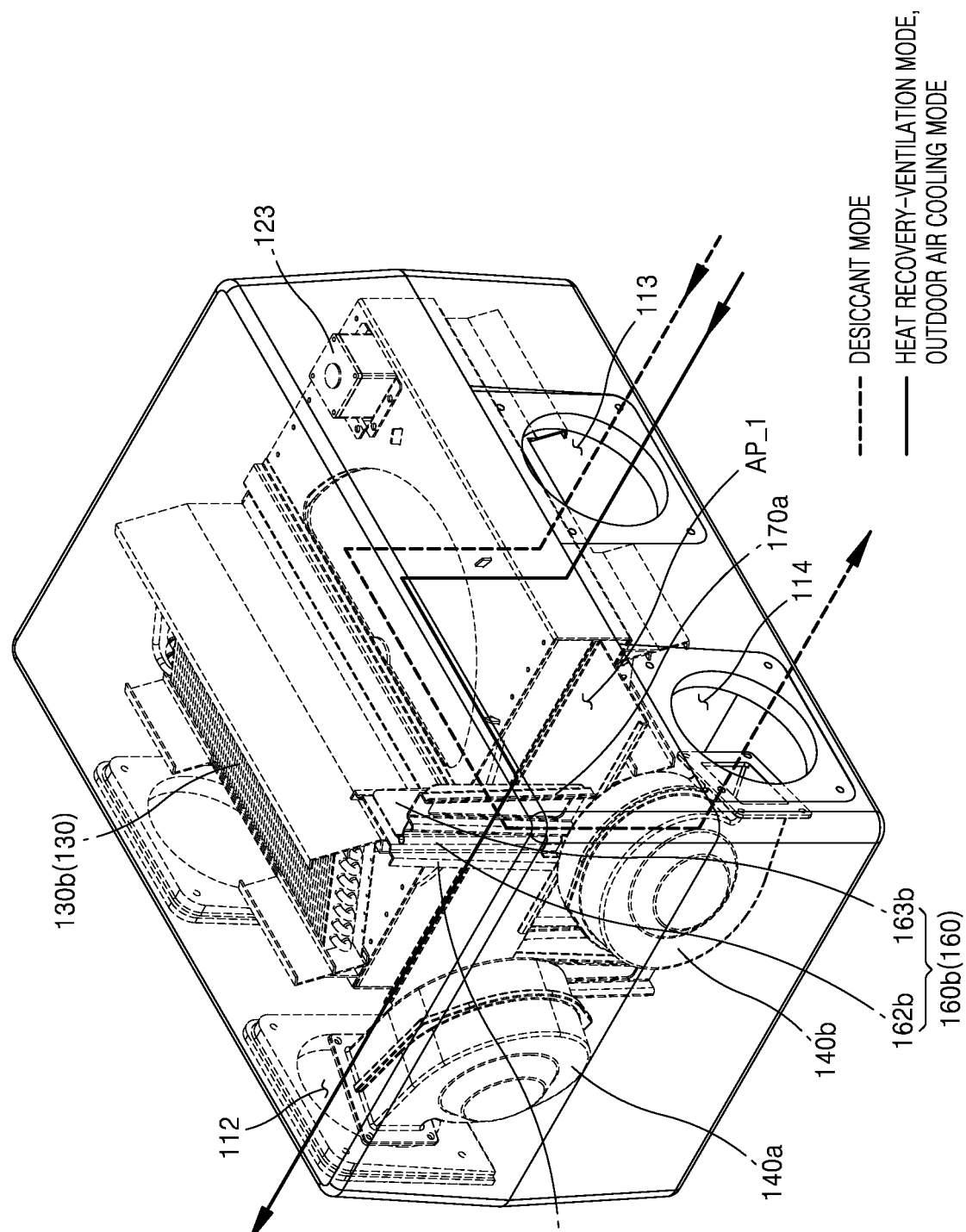
FIG. 11 is a perspective view of a path through which indoor air which has entered the air conditioning system of FIG. 1 flows inside the air conditioning system.
Figure 12:
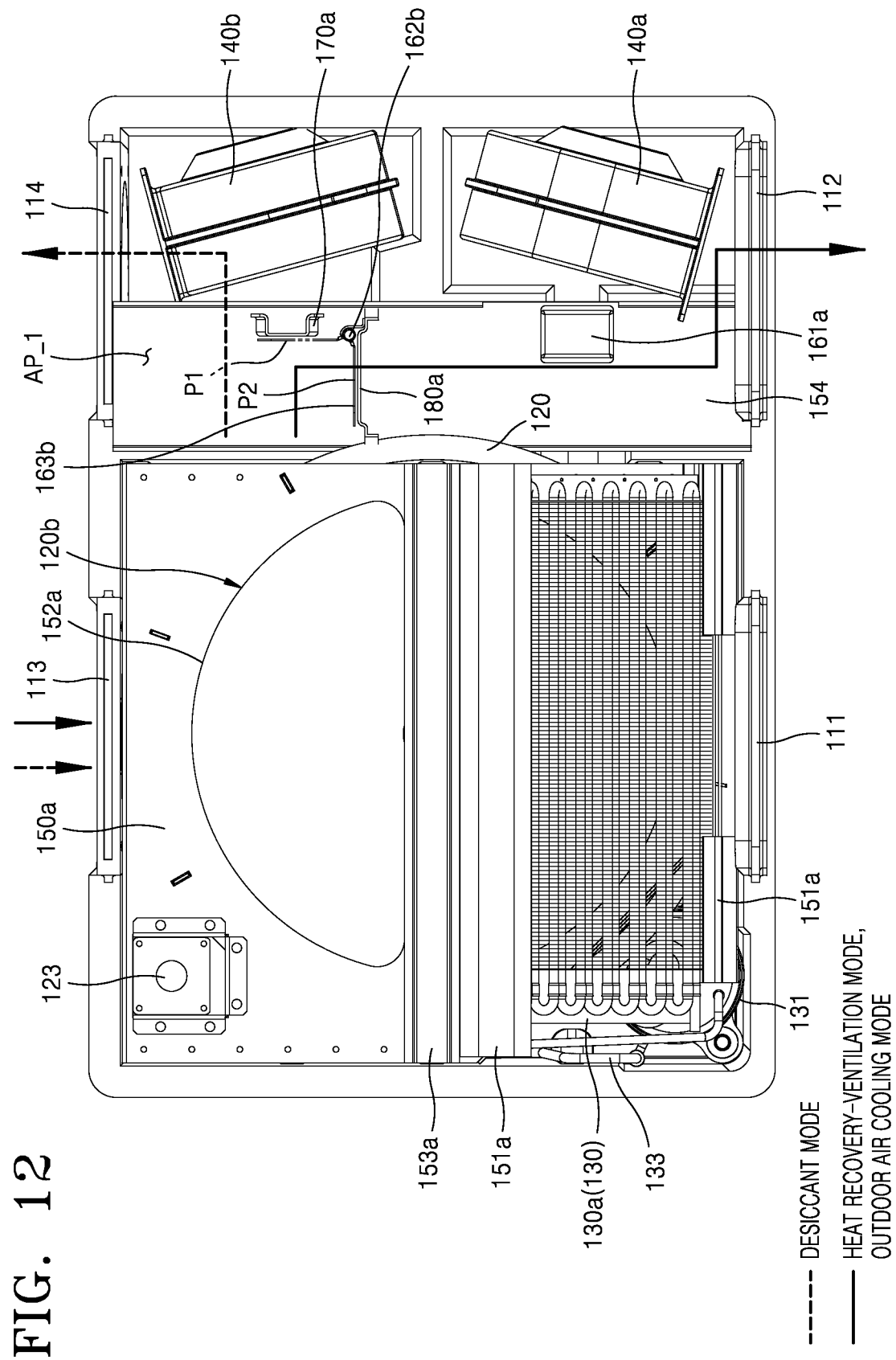
FIG. 12 is an exploded plan view of the air conditioning system of FIG. 11, from which a first sub-case is removed, illustrating a path through which indoor air which has entered the air conditioning system flows in the air conditioning system.

FIG. 11 is a perspective view of a path through which an indoor air, which has entered the air conditioning system 100 of FIG. 1, flows inside the air conditioning system 100. FIG. 12 is an exploded plan view of the air conditioning system 100 of FIG. 11, from which the first sub-case 110*a* is removed, to illustrate a path through which an indoor air, which has entered the air conditioning system 100, flows in the air conditioning system 100.

The flow path of the indoor air shown in FIGS. 11 and 12 may include i) a desiccant mode denoted by a dotted line and ii) a heat recovery ventilation mode or an outdoor air cooling mode denoted by a solid line.

First, if the air conditioning system 100 is driven in a desiccant mode, the indoor air may enter the first sub-case 110*a* through the air returning inlet 113. The indoor air that has entered the first sub-case 110*a* at the air returning inlet 113 may be cooled by passing through the second sub-heat exchanger 130*b*, and the cooled indoor air may flow to the second region 120*b* of the desiccant rotor module 120. Vapor contained in the cooled indoor air may flow to the second region 120*b* of the desiccant rotor module 120 to be adsorbed to the second region 120*b* of the desiccant rotor module 120, and due to heat of the adsorption, the indoor air may be heated to a predetermined temperature.

After being cooled by passing through the second sub-heat exchanger 130*b*, the indoor air is heated again by passing through the second region 120*b* of the desiccant rotor module 120. However, as heating effects due to the desiccant rotor module 120 are relatively small compared to the cooling effects due to the second sub-heat exchanger 130*b*, consequently, the indoor air that passes through the second region 120*b* of the desiccant rotor module 120 to move toward the second sub-ventilator 140*b* may be in a dehumidified and cooled state compared to a state thereof before entering the air conditioning system 100. As described above, the indoor air that is dehumidified and cooled by passing through the second region 120*b* of the desiccant rotor module 120 may pass through the second sub-ventilator 140*b* to enter the first air flow path region AP_1.

Here, if the air conditioning system 100 is driven in a desiccant mode, the second sub-damper 160*b* is located in the second position P2 where the first air supply gate 170*a* is opened and the first air discharge gate 180*a* is closed. Accordingly, the indoor air that is dehumidified and cooled by passing through the second sub-heat exchanger 130*b* and the second region 120*b* of the desiccant rotor module 120 may be guided to the air supply inlet 114 through the first air supply gate 170*a*, and then supplied indoors again through the air supply inlet 114.

If the air conditioning system 100 is driven in ii) a heat recovery ventilation mode or an outdoor air cooling mode, the operation of the heat exchanger 130 is stopped as described above, and thus, the indoor air passes through the second sub-heat exchanger 130*b* without temperature change, and then while the indoor air passes through the second region 120*b* of the desiccant rotor module 120, the indoor air may maintain a similar temperature as a temperature of an outdoor air through total heat exchange with the outdoor air passing through the first region 120*a*. In this state, the indoor air may enter the first air flow path region AP_1 through the second sub-ventilator 140*b*.

If the air conditioning system 100 is driven in an outdoor air cooling mode, not only the heat exchanger 130 but the desiccant rotor module 120 also stops operating, and thus, the indoor air that has entered through the air returning inlet 113 may enter the first air flow path region AP_1 without undergoing total heat exchange with outdoor air as described above, that is, unchanged.

Meanwhile, if the air conditioning system 100 is driven in ii) a heat recovery ventilation mode or an outdoor air cooling mode, the second sub-damper 160*b* is located in the first position P1 where the first air discharge gate 180*a* is opened and the first air supply gate 170*a* is closed. Accordingly, the indoor air that has passed through the second region 120*b* of the desiccant rotor module 120 may pass through the first air discharge gate 180*a* to be guided to the discharge outlet 112 along the first air flow path region AP_1, and then discharged to the outside through the discharge outlet 112. That is, in a heat recovery ventilation mode, the indoor air may be discharged to the outside after undergoing heat exchange with an outdoor air, and in the outdoor air cooling mode, the indoor air may be discharged to the outside without change.

According to the air conditioning system 100 having the above-described structure, the elements other than the case 110 may be formed as a single unit so as to be detachably mounted to the case 110 to thereby implement the air conditioning system 100 of a mechanically simple structure.

In addition, according to the air conditioning system 100 of the embodiments of the present disclosure, by controlling whether to operate the heat exchanger 130, a rotational speed of the desiccant rotor module 120, and a rotational angle of the damper 160, an operational mode such as a desiccant mode, a heat recovery ventilation mode or an outdoor air cooling mode may be selected and executed.

In addition, according to the air conditioning system 100 of the embodiments, as the first sub-case 110*a* and the second sub-case 110*b* include the first cover plate 163*a* and the second cover plate 163*b* and the fixing plate 150 that respectively divides the flows of the outdoor air and the indoor air, a rigid sealing structure may be formed, which prevents mixture between or leakage of the outdoor air and the indoor air flowing in the case 110.

In addition, according to the air conditioning system 100 of the embodiments, by forming the first sub-case 110*a* and the second sub-case 110*b* forming the case 110 in an identical shape, the manufacturing time and costs may be reduced, thereby maximizing productivity of the air conditioning system 100.

According to the air conditioning system having the above-described structure, the other elements except the case may be formed as a single unit so as to be detachably mounted to the case to thereby implement the air conditioning system in an instrumentally simple structure.

In addition, according to the air conditioning system of the embodiments, by controlling whether to operate the heat exchanger, a rotational speed of the desiccant rotor module, and a rotational angle of the damper, an operational mode such as a desiccant mode, a heat recovery ventilation mode or an outdoor air cooling mode may be selected and executed.

In addition, according to the air conditioning system of the embodiments, as the first sub-case and the second sub-case of the air conditioning system include the first cover plate and the second cover plate and the fixing plate that respectively divide the flows of outdoor air and indoor air, a rigid sealing structure may be formed, which prevents mixture between or leakage of the outdoor air and the indoor air flowing in the case.

In addition, according to the air conditioning system of the embodiments, by forming the first sub-case and the second sub-case forming the case in an identical shape, the manufacturing time and costs may be reduced, thereby maximizing productivity.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An air conditioning system comprising: a case including a first sub-case including an outdoor air inlet and a discharge outlet, and a second sub-case including an air returning inlet and an air supply inlet;
   a desiccant rotor module that includes a moisture absorbing material and is installed in the case, wherein the desiccant rotor module is rotatable about a rotational shaft extending in a direction across a coupling surface between the first sub-case and the second sub-case;
   a heat exchanger including a first sub-heat exchanger and a second sub-heat exchanger, wherein the first sub-heat exchanger is installed in a path through which outdoor air entering the case through the outdoor air inlet moves to a first region of the desiccant rotor module and through which a heat transfer medium for heat exchange flows, and the second sub-heat exchanger is installed in a path through which indoor air entering the case through the air returning inlet moves to a second region of the desiccant rotor module and through which the heat transfer medium for heat exchange flows, the second region being opposite the first region with respect to the rotational shaft,
   a ventilator including a first sub-ventilator installed upstream or downstream of the first region of the desiccant rotor module and a second sub-ventilator installed upstream or downstream of the second region of the desiccant rotor module;
   a damper including a first sub-damper and a second sub-damper, wherein the first sub-damper is installed downstream of the first region of the desiccant rotor module to guide the outdoor air that has passed through the first region of the desiccant rotor module to one of the discharge outlet and the air supply inlet, and the second sub-damper is installed downstream of the second region of the desiccant rotor module to guide the indoor air that has passed through the second region of the desiccant rotor module to one of the discharge outlet and the air supply inlet; and
   a fixing plate comprising:
   a first sub-fixing plate that is installed between the first sub-case and the desiccant rotor module and includes a first installation support on which the first sub-heat exchanger is installed and a first ventilation inlet providing a path through which the indoor air that has entered through the air returning inlet passes through the second region of the desiccant rotor module and moves to the discharge outlet; and
   a second sub-fixing plate that is installed between the second sub-case and the desiccant rotor module and includes a second installation support on which the second sub-heat exchanger is installed and a second ventilation inlet providing a path through which the outdoor air that has entered through the outdoor air inlet passes through the first region of the desiccant rotor module and moves to the discharge outlet,
   wherein the desiccant rotor module and the heat exchanger are integrally assembled to be detachably installed in the case,
   wherein the outdoor air and the indoor air do not mix with each other.

2. The air conditioning system of claim 1, wherein a shape of the first sub-case and a shape of the second sub-case are identical.

3. The air conditioning system of claim 1, wherein the first sub-case includes a portion of the outdoor air inlet, the discharge outlet, the air returning inlet, and the air supply inlet, and
   the second sub-case includes another portion of the outdoor air inlet, the discharge outlet, the air returning inlet, and the air supply inlet.

4. The air conditioning system of claim 1, wherein the first sub-case further includes at least one first opening, and the second sub-case further includes at least one second opening.

5. The air conditioning system of claim 1, wherein the first sub-case includes a first separation plate that is installed between the first sub-heat exchanger and the second region of the desiccant rotor module and separates the first sub-heat exchanger from the second region of the desiccant rotor module so as to prevent mixture between the outdoor air passing through the first sub-heat exchanger and the indoor air passing through the second region of the desiccant rotor module.

6. The air conditioning system of claim 5, wherein the first sub-fixing plate further comprises a first protrusion protruding toward the first separation plate, and
the first separation plate includes a first receiving recess receiving the first protrusion.

7. The air conditioning system of claim 1, wherein the second sub-case includes a second separation plate that is installed between the second sub-heat exchanger and the first region of the desiccant rotor module and separates the second sub-heat exchanger from the first region of the desiccant rotor module so as to prevent mixture between the indoor air passing through the second sub-heat exchanger and the outdoor air passing through the first region of the desiccant rotor module.

8. The air conditioning system of claim 7, wherein the second sub-fixing plate further includes a second protrusion protruding toward the second separation plate, and
the second separation plate includes a second receiving recess receiving the second protrusion.

9. An air conditioning system comprising: a case including a first sub-case including an outdoor air inlet and a discharge outlet, and a second sub-case including an air returning inlet and an air supply inlet;
a desiccant rotor module that includes a moisture absorbing material and is installed in the case, wherein the desiccant rotor module is rotatable about a rotational shaft extending in a direction across a coupling surface between the first sub-case and the second sub-case;
a heat exchanger including a first sub-heat exchanger and a second sub-heat exchanger, wherein the first sub-heat exchanger is installed in a path through which outdoor air entering the case through the outdoor air inlet moves to a first region of the desiccant rotor module and through which a heat transfer medium for heat exchange flows, and the second sub-heat exchanger is installed in a path through which indoor air entering the case through the air returning inlet moves to a second region of the desiccant rotor module and through which the heat transfer medium for heat exchange flows, the second region being opposite the first region with respect to the rotational shaft,
a ventilator including a first sub-ventilator installed upstream or downstream of the first region of the desiccant rotor module and a second sub-ventilator installed upstream or downstream of the second region of the desiccant rotor module; and
a damper including a first sub-damper and a second sub-damper, wherein the first sub-damper is installed downstream of the first region of the desiccant rotor module to guide the outdoor air that has passed through the first region of the desiccant rotor module to one of the discharge outlet and the air supply inlet, and the second sub-damper is installed downstream of the second region of the desiccant rotor module to guide the indoor air that has passed through the second region of the desiccant rotor module to the other of the discharge outlet and the air supply inlet, wherein
the first sub-case further includes a first air flow path region in which the indoor air that has passed through the second region of the desiccant rotor module flows,
the second sub-case further includes a second air flow path region in which the outdoor air that has passed through the first region of the desiccant rotor module flows,
the air conditioning system further comprises an air flow path partitioning plate that separates the first air flow path region from the second air flow path region, and
the indoor air flowing in the first air flow path region and the outdoor air flowing in the second flow path region do not mix with each other.

10. The air conditioning system of claim 9, further comprising:
a first air supply gate guiding, toward the air supply inlet, the indoor air that has passed through the second region of the desiccant rotor module; and
a first air discharge gate guiding, toward the discharge outlet, the indoor air that has passed through the second region of the desiccant rotor module,
wherein the first air supply gate and the first air discharge gate are installed on a portion of the air flow path partitioning plate at the first air flow path region.

11. The air conditioning system of claim 10, wherein the second sub-damper comprises:
a damper driver installed on a portion of the air flow path partitioning plate at the second air flow path region;
a damper rotational shaft rotatably connected to the damper driver to pass through the air flow path partitioning plate and protrude toward the first air flow path region; and
a cover plate connected to the damper rotational shaft to be movable between a first position in which the first air supply gate is closed and a second position in which the first air discharge gate is closed.

12. The air conditioning system of claim 10, further comprising:
a second air discharge gate guiding, toward the discharge outlet, the outdoor air that has passed through the first region of the desiccant rotor module; and
a second air supply gate guiding, toward the air supply inlet, the outdoor air that has passed through the first region of the desiccant rotor module,
wherein the second air discharge gate and the second air supply gate are installed on a portion of the air flow path partitioning plate at the second air flow path region.

13. The air conditioning system of claim 12, wherein the first sub-damper comprises:
a first damper driver installed on the portion of the air flow path partitioning plate at the first air flow path region;
a first damper rotational shaft rotatably connected to the first damper driver to pass through the air flow path partitioning plate and protrude toward the second air flow path region; and
a first cover plate connected to the first damper rotational shaft to be movable between a third position in which the second air discharge gate is closed and a fourth position in which the second air supply gate is closed.

14. The air conditioning system of claim 1, wherein the heat exchanger further comprises a compressor compressing the heat transfer medium, wherein the first sub-heat exchanger is a condenser heating the outdoor air entering through the outdoor air inlet, and the second sub-heat exchanger is an evaporator cooling the indoor air entering through the air returning inlet, wherein the compressor, the first sub-heat exchanger and the second sub-heat exchanger are sequentially connected to one another via a heat transfer medium pipe.

15. The air conditioning system of claim 14, wherein the desiccant rotor module, the first sub-heat exchanger and the second sub-heat exchanger are integrally assembled to be detachably installed in the case.

16. The air conditioning system of claim 14, wherein moisture contained in the first region of the desiccant rotor module is evaporated by the outdoor air heated by passing through the first sub-heat exchanger, wherein the second region of the desiccant rotor module adsorbs vapor in the indoor air that is cooled by passing through the second sub-heat exchanger.

17. The air conditioning system of claim 1, wherein the outdoor air that is humidified by passing the first region of the desiccant rotor module is discharged to the outside through the discharge outlet, and the indoor air that is dehumidified by passing the second region of the desiccant rotor module is supplied indoors through the air supply inlet.

18. The air conditioning system of claim 1, further comprising a condensate discharge pipe connecting the second sub-heat exchanger with an outlet of the first sub-ventilator, wherein a portion of vapor contained in the indoor air that has entered through the air returning inlet is condensed on a surface of the second sub-heat exchanger to be guided to the outlet through the condensate discharge pipe.

19. The air conditioning system of claim 1, further comprising a controller comprising:

a driving controller configured to apply a control signal to the desiccant rotor module to control a rotational speed of the desiccant rotor module according to a plurality of operational modes;

a heat pump controller configured to apply a control signal to the heat exchanger to control whether to operate the first sub-heat exchanger and the second sub-heat exchanger; and a damper controller configured to apply a control signal to the damper to control a rotational angle of the first sub-damper and the second sub-damper.

20. The air conditioning system of claim 19, wherein the controller selects and executes one of:

a desiccant mode in which a rotational speed of the desiccant rotor module is controlled at a low speed of a preset range, the first sub-heat exchanger and the second sub-heat exchanger are actuated, and the first sub-damper is controlled to guide, to the discharge outlet, the outdoor air which has been heated and humidified by passing through the first sub-heat exchanger and the first region of the desiccant rotor module, and the second sub-damper is controlled to guide, to the air supply inlet, the indoor air which has been cooled and dehumidified by passing through the second sub-heat exchanger and the second region of the desiccant rotor module;

a heat recovery ventilation mode in which a rotational speed of the desiccant rotor module is controlled at a high speed of a preset range, operations of the first sub-heat exchanger and the second sub-heat exchanger are stopped, the first sub-damper is controlled to guide, to the air supply inlet, the outdoor air which has undergone total heat exchange with the indoor air passing through the second region of the desiccant rotor module while the outdoor air passes through the first region of the desiccant rotor module, and the second sub-damper is controlled to guide, to the discharge outlet, the indoor air which has undergone total heat exchange with the outdoor air passing through the first region of the desiccant rotor module while the indoor air passes the second region of the desiccant rotor module; and an outdoor air cooling mode in which operation of the desiccant rotor module is stopped, operations of the first sub-heat exchanger and the second sub-heat exchanger are stopped, the first sub-damper is controlled to guide the outdoor air to the air supply inlet through the first sub-ventilator, and the second sub-damper is controlled to guide the indoor air to the discharge outlet.

21. The air conditioning system of claim 20, further comprising:

an outdoor temperature sensor installed at the outdoor air inlet and configured to sense a temperature of the outdoor air entering through the outdoor air inlet;

an indoor temperature sensor installed at the air returning inlet and configured to sense a temperature of the indoor air entering through the air returning inlet;

an indoor humidity sensor installed at the air returning inlet and configured to sense a relative humidity of the indoor air entering through the air returning inlet; and an indoor carbon dioxide sensor installed at the air returning inlet and configured to sense a carbon dioxide ($CO_2$) concentration of the indoor air entering through the air returning inlet; and an indoor volatile organic compound sensor installed at the air returning inlet and configured to sense a total volatile organic compound (TVOC) concentrations of the indoor air entering through the air returning inlet, wherein the controller comprises a sensor receiver configured to receive a temperature of the outdoor air, a temperature of the indoor air, a relative humidity of the indoor air, a carbon dioxide concentration of the indoor air, and a total volatile organic compound concentration of the indoor air respectively sensed using the outdoor temperature sensor, the indoor temperature sensor, the indoor humidity sensor, the indoor carbon dioxide sensor, and the indoor total volatile organic compound sensor.

22. The air conditioning system of claim 21, further comprising a user input unit configured to receive, from a user, a user input signal used to select one of the desiccant mode, the heat recovery ventilation mode, and the outdoor air cooling mode and to receive, from the user, a set value of an indoor relative humidity, a set value of an indoor carbon dioxide concentration, a set value of an indoor volatile organic compound concentration, and a set value of a comfortable indoor cooling temperature from a user to generate a control signal, wherein the controller further comprises a user input receiver configured to store the user input signal and the set value of the indoor relative humidity, the set value of the indoor carbon dioxide concentration, the set value of the indoor total volatile organic compound concentration, and the set value of the comfortable indoor cooling temperature.

23. The air conditioning system of claim 22, wherein if a relative humidity of the indoor air received via the sensor receiver is 110% or more of the set value of the indoor relative humidity stored in the user input receiver, the controller executes the desiccant mode.

24. The air conditioning system of claim 23, wherein a rotational speed of the desiccant rotor module is proportional to a difference in the relative humidity of the indoor air and the set value of the indoor relative humidity.

25. The air conditioning system of claim 22, wherein if a carbon dioxide concentration of the indoor air received via the sensor receiver is higher than the set value of the indoor carbon dioxide concentration stored in the user input receiver, or if a total volatile organic compound concentration of the indoor air received by the sensor receiver is higher than the set value of the indoor total volatile organic compound concentration stored in the user input receiver, the controller executes the heat recovery ventilation mode.

26. The air conditioning system of claim 25, wherein a rotational speed of the desiccant rotor module is proportional to a difference in the carbon dioxide concentration of the indoor air and the set value of the indoor carbon dioxide concentration, and a difference in the total volatile organic compound concentration of the indoor air and the set value of the indoor total volatile organic compound concentration.

27. The air conditioning system of claim 22, wherein
the controller executes the outdoor air cooling mode if the temperature of the outdoor air received via the sensor receiver is lower than the temperature of the indoor air, and at the same time, the temperature of the indoor air received via the sensor receiver is higher than the set value of the comfortable indoor cooling temperature stored in the user input receiver.

* * * * *